(12) United States Patent
Biswas et al.

(10) Patent No.: US 10,664,641 B2
(45) Date of Patent: May 26, 2020

(54) INTEGRATED DEVICE AND METHOD OF FORMING THE SAME

(71) Applicant: TAIWAN SEMICONDUCTOR MANUFACTURING COMPANY LTD., Hsinchu (TW)

(72) Inventors: Hiranmay Biswas, Kolkata (IN); Kuo-Nan Yang, Hsinchu (TW); Chung-Hsing Wang, Hsinchu County (TW); Meng-Xiang Lee, Yunlin County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 161 days.

(21) Appl. No.: 15/933,785

(22) Filed: Mar. 23, 2018

(65) Prior Publication Data

US 2019/0163861 A1 May 30, 2019

Related U.S. Application Data

(60) Provisional application No. 62/592,963, filed on Nov. 30, 2017.

(51) Int. Cl.
*G06F 17/50* (2006.01)
*G06F 30/394* (2020.01)
*H01L 27/02* (2006.01)
*H01L 27/118* (2006.01)
*H01L 23/528* (2006.01)
(Continued)

(52) U.S. Cl.
CPC .......... *G06F 30/394* (2020.01); *H01L 23/528* (2013.01); *H01L 27/0207* (2013.01); *H01L 27/11807* (2013.01); *G06F 2111/04* (2020.01); *G06F 2111/20* (2020.01); *G06F 2119/18* (2020.01); *H01L 2027/11861* (2013.01);
(Continued)

(58) Field of Classification Search
CPC . G06F 17/5077; G06F 2217/02; H01L 23/528
USPC .................................................... 716/126
See application file for complete search history.

(56) References Cited

U.S. PATENT DOCUMENTS

2006/0017158 A1* 1/2006 Takahata ............. H01L 23/5226
257/734
2006/0071319 A1* 4/2006 Nishimura ........ H01L 21/76838
257/691
(Continued)

*Primary Examiner* — Suchin Parihar
(74) *Attorney, Agent, or Firm* — WPAT, P.C., Intellectual Property Attorneys; Anthony King

(57) ABSTRACT

A method for forming an integrated device includes following operations. A first circuit is provided. The first circuit has a first connecting path, a plurality of second connecting paths, and a third connecting path. The plurality of second connecting paths are electrically connected to a first connecting portion of the first connecting path. The third connecting path is electrically coupled to a second connecting portion of the first connecting path. An electromigration (EM) data of the first connecting path is analyzed to determine if a third connecting portion between the first connecting portion and the second connecting portion induces EM phenomenon. The first circuit is modified for generating a second circuit when the third connecting portion induces EM phenomenon. The integrated device according to the second circuit is generated.

20 Claims, 23 Drawing Sheets

(51) Int. Cl.
*G06F 111/04* (2020.01)
*G06F 111/20* (2020.01)
*G06F 119/18* (2020.01)

(52) U.S. Cl.
CPC .............. *H01L 2027/11875* (2013.01); *H01L 2027/11877* (2013.01)

(56) References Cited

U.S. PATENT DOCUMENTS

| | | | |
|---|---|---|---|
| 2007/0151356 A1* | 7/2007 | Sumigawa | G01B 7/16 73/777 |
| 2009/0151998 A1* | 6/2009 | Fujiwara | H05K 1/097 174/350 |
| 2012/0025403 A1* | 2/2012 | Yokogawa | G06F 17/5036 257/786 |
| 2017/0242067 A1* | 8/2017 | Wang | G01R 31/2858 |

\* cited by examiner

INTEGRATED DEVICE AND METHOD OF FORMING THE SAME

CROSS-REFERENCE TO RELATED APPLICATION

This application claims the benefit of U.S. Provisional Application No. 62/592,963, filed on Nov. 30, 2017, which is incorporated by reference in its entirety.

BACKGROUND

Electromigration (EM) is the transport of atoms within a conductive material, which is caused by collisions that transfer momentum between conducting electrons and the atoms of the conductive material. Modern day integrated chips often experience electromigration in metal interconnect layers. For example, as electrons carry a current to a semiconductor device, the electrons collide with metal atoms in the metal interconnect layers. The collisions cause metal atoms within the metal interconnect layers to move (i.e., undergo electromigration), resulting in voids in the metal interconnect layers that can lead to integrated chip (IC) failure.

Traditional EM analysis has focused on higher metal layers that interconnect the cells. With shrinking wire dimensions and increasing current density, the current in lower metal layers within the cells may induce EM phenomenon on the lower metal lines. However, during the signal EM signoff flow, the traditional tools may not be able to check the EM condition on the cell output pins.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
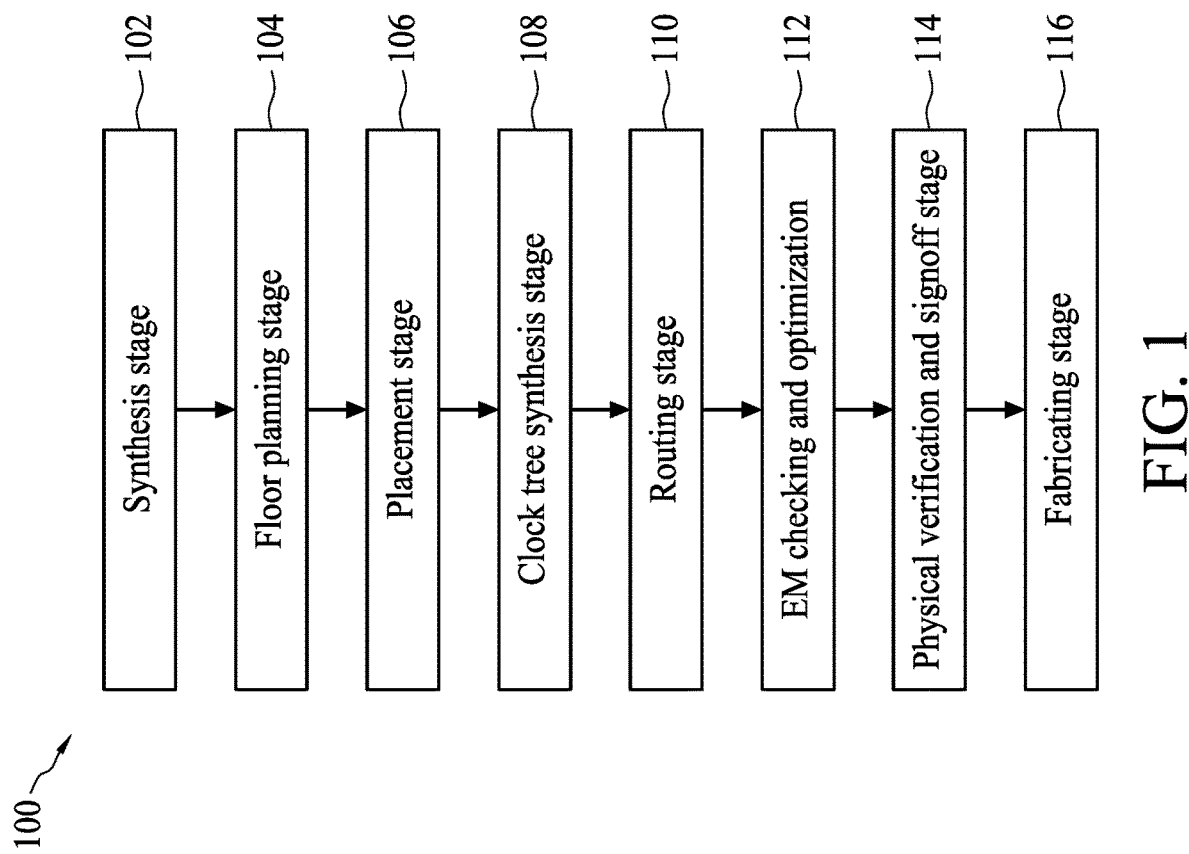
FIG. 1 is a flowchart of a fabricating flow for forming an integrated device or an IC chip in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper" and the like, may be used herein for case of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flowchart of a fabricating flow 100 for forming an integrated device or an IC chip in accordance with some embodiments of the present disclosure. The fabricating flow 100 utilizes at least one electronic design automation (EDA) tool and at least one fabrication tool to carry out one or more operations in the flow 100. In some embodiments, the EDA tool may analyze EM condition on the interconnecting paths connected among the standard cells. The EDA tool may also analyze the EM condition on the cell output pins in the standard cells. In one or more embodiments, the EDA tool may be able detect the EM hotspot during routing and modify the corresponding connecting path.

Referring to FIG. 1, at a synthesis operation 102, a high-level design of an IC chip is provided by a circuit designer. In some embodiments, a semiconductor circuit or an integrated circuit (IC) is generated through the logic synthesis based on the high-level design. The logic gates in the integrated circuit are mapped to available cells in a standard cell library. The integrated circuit may be a gate-level netlist. The term "netlist" used herein refers to both graphical-based representation such as a schematic and/or a text-based representation of a circuit. During the synthesis operation, the RTL (Register Transfer Level) design is converted to gate-level descriptions. The gate-level netlist contains information of the cells, the corresponding interconnections, the area, and other details. The cells may be various standard cells selected from the standard cell library. In addition, during the synthesis operation, constraints may be applied to ensure that the gate-level design meets the required functionality and speed. This is not a limitation of the present embodiment.

At a floor planning operation 104, the integrated circuit is partitioned into functional blocks and a floorplan for the functional blocks in a design layout of the IC chip is created. The floor planning operation is the operation of identifying structures that can be placed close together, and allocating space for the structures to meet the required area and performance, for example, of the design layout. The floor planning operation takes into account the macros, memory, and/or other IP cores used in the design layout. The floor planning operation also takes into account the corresponding placement of the circuit blocks used in the design layout. According to some embodiments, the floor planning operation determines the IO structure and aspect ratio of the design layout.

At a placement operation 106, mapped cells of logic gates and registers of the circuit blocks are placed at specific locations in the design layout.

At a clock tree synthesis (CTS) operation 108, a CTS tool may automatically designs a clock tree for distributing a clock signal to a plurality of clocked devices such as flip-flops, registers, and/or latches that change state in response to clock signal pulses. The CTS tool may lay out the conductors forming the clock tree in a way that tries to equalize the distance the clock signal travelling to each clocked device from an IC input terminal receiving the clock signal from an external source. The CTS tool may place buffers or amplifiers at branch points of the tree sized as necessary to drive all of the buffers or clocked devices downstream of the branch point. Based on an estimate of the signal path delay in each branch of the clock tree, the CTS tool may balance the clock tree by inserting addition buffers in selected branches of the clock tree to adjust the path delays within those branches to ensure that the clock tree will deliver each clock signal pulse to every clocked device at nearly the same time.

At a routing operation 110, signal nets are routed. Routing of signal nets comprises the placement of signal net wires on a metal layer within placed standard cells to carry non-power signals between different functional blocks.

At an EM checking and optimizing operation 112, an EM checking operation is performed upon the cells and the corresponding interconnects in the integrated circuit. During the EM checking operation, the cell(s) and/or the interconnect(s) that induces EM phenomenon is highlighted. The highlighted portions may be modified into a new cell or a new interconnect. A modified integrated circuit is formed accordingly, in which the EM phenomenon may be alleviated. The EM checking and optimizing may be performed automatically or manually.

At a physical verification and signoff operation 114, layout-versus-schematic (LVS) is performed on a physical netlist generated from the design layout to ensure correspondence of the design layout to the modified integrated circuit. Further, design rule check (DRC) is performed on the design layout to ensure the design clean of, for example, electrical issues and lithographic issues for manufacturing. Incremental fixing can be performed to achieve final signoff of the IC chip design before tape-out.

At a fabricating operation 116, a fabricating tool receives a GDS file corresponding to an IC chip for fabrication. The GDS file is a graphical representation of the integrated chip that can be subsequently used for making photomasks used in the IC fabrication operation. In the fabricating operation 116, a semiconductor device corresponding to the GDS file is fabricated.

During the EM checking and optimizing operation 112, the cells in the integrated circuit and the corresponding interconnecting paths are checked and modified. The EM checking and optimizing operation 112 is discussed in detail below.

Figure 2:
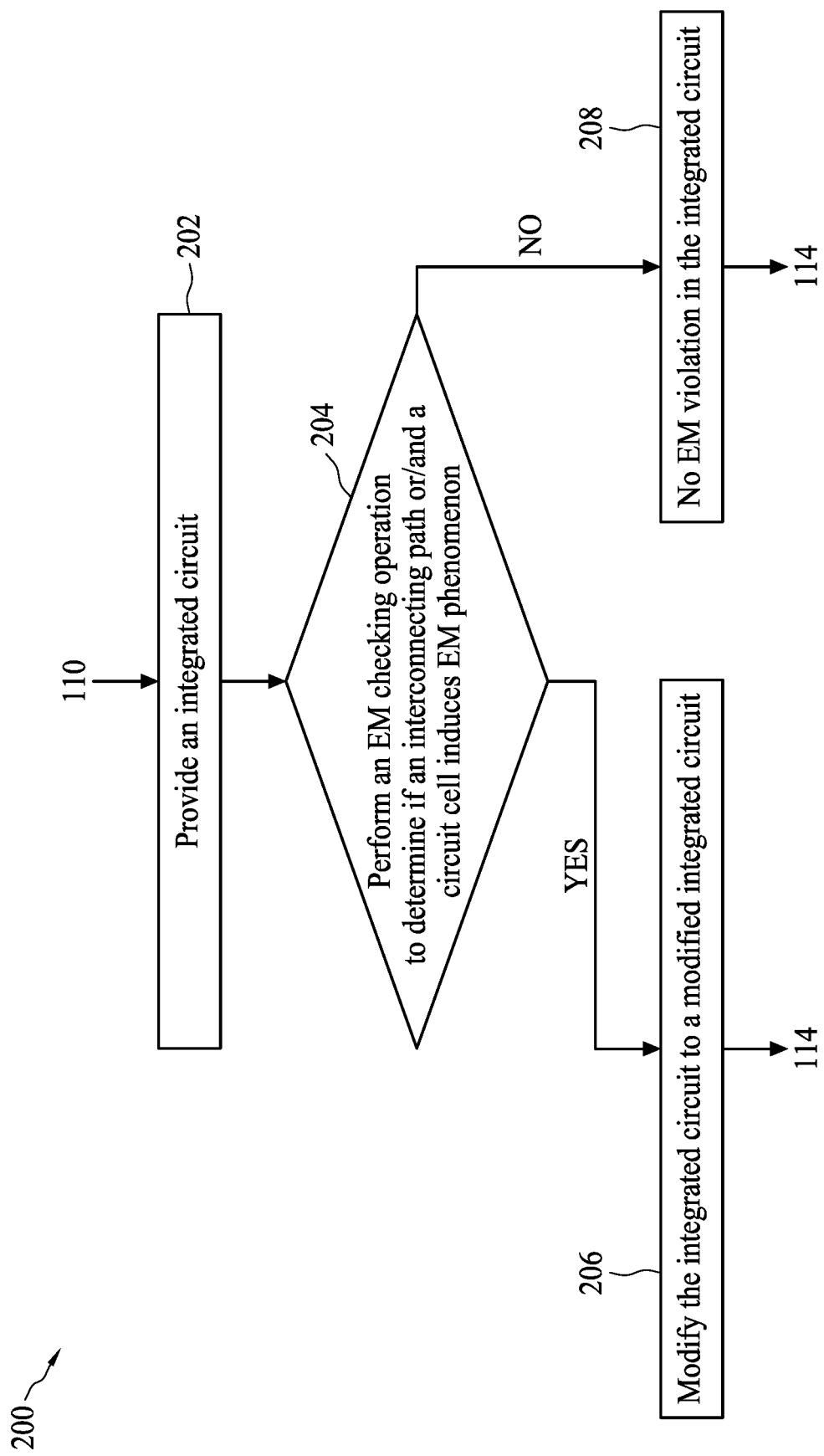
FIG. 2 is a flowchart illustrating an EM checking and optimizing operation in accordance with some embodiments of the present disclosure.

FIG. 2 is a flowchart illustrating an EM checking and optimizing operation 200 in accordance with some embodiments of the present disclosure. The EM checking and optimizing operation 200 may be included in the EM checking and optimizing operation 112. The EM checking and optimizing operation 200 comprises operations 202-208. In operation 202, an integrated circuit is provided. The integrated circuit may comprises a plurality of circuit cells (e.g. standard cell) and a plurality of interconnecting paths electrically connected among the plurality of circuit cells.

In operation 204, an EM checking operation is performed upon the integrated circuit. The EM checking operation may analyze the EM data of the plurality of circuit cells and the plurality of interconnecting paths to determine if an interconnecting path(s) or/and a circuit cell(s) induces EM phenomenon.

In operation 206, EM phenomenon occurs in the integrated circuit, and a modifying operation is performed upon the integrated circuit. The EM phenomenon may occur in an interconnecting path(s) or/and a circuit cell(s) of the integrated circuit. A modified integrated circuit is generated when the EM issue of the interconnecting path(s) or/and the circuit cell(s) is fixed. The modified integrated circuit is to be performed in the physical verification and signoff operation 114.

In operation 208, no EM phenomenon occurs in the integrated circuit, and the integrated circuit is to be performed in the physical verification and signoff operation 114.

Figure 3:
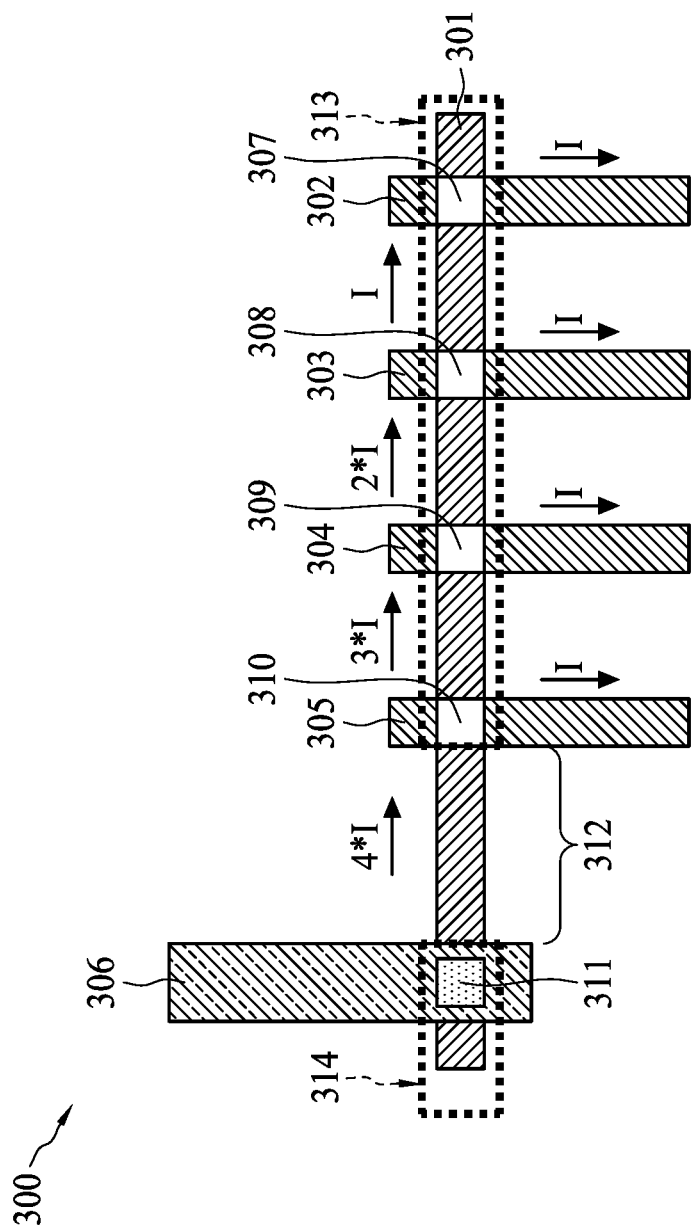
FIG. 3 is a diagram illustrating an integrated circuit in accordance with some embodiments of the present disclosure.

FIG. 3 is a diagram illustrating an integrated circuit 300 in accordance with some embodiments of the present disclosure. The EM checking operation may be performed upon the integrated circuit 300 in operation 204. In some embodiments, the integrated circuit 300 comprises a plurality of connecting paths 301-306 and a plurality of vias 307-311. The connecting paths 301-306 may be the interconnecting path between two circuit cells. The connecting paths 302-305 are metal lines formed on the first metal layer M1. The connecting path 301 is a metal line formed on the second metal layer M2. The connecting path 306 is a metal line formed on the third metal layer M3. The vias 307-310 are arranged to electrically connect the connecting paths 302-305 to the connecting path 301 respectively. The via 311 is arranged to electrically connect the connecting path 301 to the connecting path 306.

In one or more embodiments, the number of connecting paths 301-306 are, of course, merely examples and are not intended to be limiting. In some embodiments, the connecting paths on the first metal layer M1 may be three, five, six, or more, depending on the needs of the design.

During the EM checking operation in operation 204, the widths of the connecting paths 301-306 and the currents flowing through the connecting paths 301-306 are analyzed by an EDA tool. According to some embodiments, the connecting paths 302-305 are arranged to have the same width. The current flowing through each of the connecting paths 302-305 is I during the operation of the integrated circuit 300. Therefore, the current flowing through the connecting portion 312 of the connecting path 301 is 4*I, i.e. the sum of each current I on the connecting paths 302-305. The connecting portion 312 is the portion between the connecting path 313 and the connecting portion 314. In other words, the connecting portion 312 conveys the largest current in comparison to the connecting portion 313, in which the current flowing through the connecting portion 313 is smaller than 4*I as shown in FIG. 3. In this embodiment, the connecting portion 312 may be the EM hotspot to induce EM phenomenon as the connecting portion 312 has the largest current (e.g. 4*I) flowing through. On the other hand, the connecting portion 313 is the EM safe zone as the current flowing through the connecting portion 313 is smaller than the largest current.

As an EM phenomenon occurs on the connecting portion 312 of the integrated circuit 300, and a modifying operation is performed upon the integrated circuit 300 in operation 206. According to some embodiments, the EDA tool may move the connecting path 306 and the via 311 from the connecting portion 314 to the connecting portion 313 (i.e. the EM safe zone) in order to reduce the current flowing through the connecting portion 312. FIG. 4A is a diagram illustrating a modified integrated circuit 400a in accordance with some embodiments of the present disclosure. In some embodiments, the EDA tool is arranged to move the connecting path 306 and the via 311 to a connecting portion between connecting paths 304 and 305. Specifically, the connecting path 306 and the via 311 may be moved to the connecting portion between a first position P1 and a second position P2 in the connecting portion 313, in which the first position P1 is the position of the via 309 and the second position P2 is the position of the via 310. In this embodiment, the current flowing through the connecting portion between connecting paths 304 and 305 is 3*I which is smaller than 4*I. Accordingly, after the modification, the largest current (i.e. 3*I) flowing through the connecting path 301 is smaller than 4*I. Therefore, the EM phenomenon of the modified integrated circuit 400a is alleviated.

Referring to FIG. 4A, in some embodiments, the position of the connecting path 306 may separate the connecting paths 302-305 into a first group and a second group, such as three connecting paths 302-304 on the right side and one connecting path 305 on the left side of the connecting path 306. These are, of course, merely examples and are not intended to be limiting. As a result, the current (e.g. 4*I) flowing through the connecting path 306 may be divided into two currents on the connecting path 301, in which one current (e.g. 3*I) flows to the first group and the other current (e.g. I) flows to the second group. Therefore, the maximum current flowing through the connecting path 301 may be decreased, and the EM phenomenon on the connecting path 301 may be alleviated.

Figure 4B:
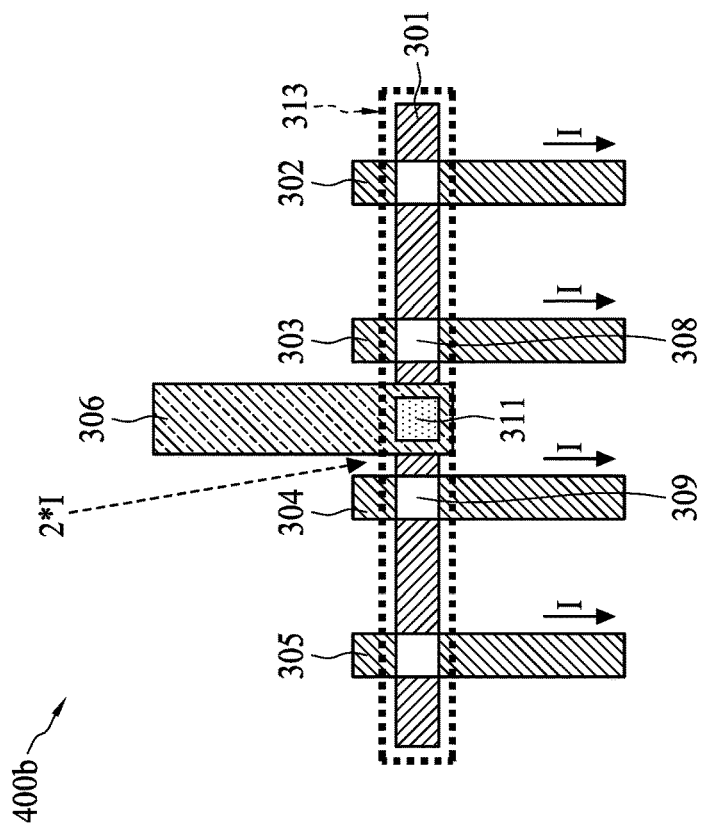
FIG. 4B, FIG. 5, and FIG. 6 are diagrams illustrating a modified integrated circuit in accordance with some embodiments of the present disclosure.
Figure 4A:
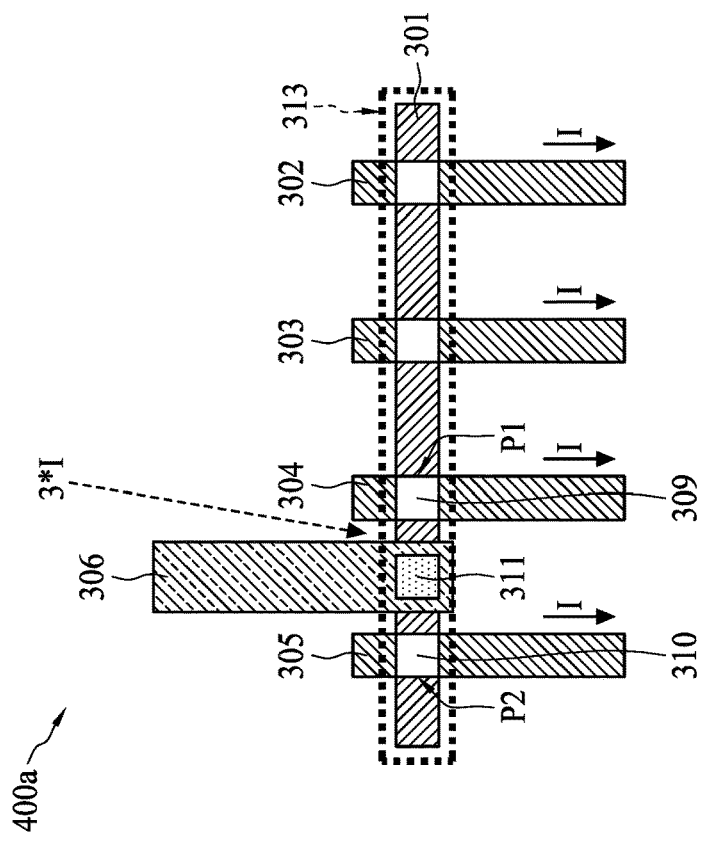
FIG. 4A.

FIG. 4B is a diagram illustrating a modified integrated circuit 400b in accordance with some embodiments of the present disclosure. In some embodiments, the EDA tool is arranged to move the connecting path 306 and the via 311 to a connecting portion between connecting paths 303 and 304. Specifically, the connecting path 306 and the via 311 may be moved to the connecting portion between the via 308 and the via 309. In this embodiment, the current flowing through the connecting portion between connecting paths 303 and 304 is 2*I, which is smaller than 4*I. Accordingly, after the modification, the largest current (i.e. 2*I) flowing through the connecting path 301 is smaller than 4*I. Therefore, the EM phenomenon of the modified integrated circuit 400b is alleviated.

Referring to FIG. 4B, in some embodiments, the position of the connecting path 306 may separate the connecting paths 302-305 into two equal groups, such as two connecting paths 302-303 on the right side and two connecting paths 304-305 on the left side of the connecting path 306. As a result, the current (e.g. 4*I) flowing through the connecting path 306 may be divided into two equal currents on the connecting path 301, in which one current (e.g. 2*I) flows to the left group and the other current (e.g. 2*I) flows to the right group. Therefore, the maximum current flowing through the connecting path 301 may be decreased, and the EM phenomenon on the connecting path 301 may be alleviated.

Figure 5:
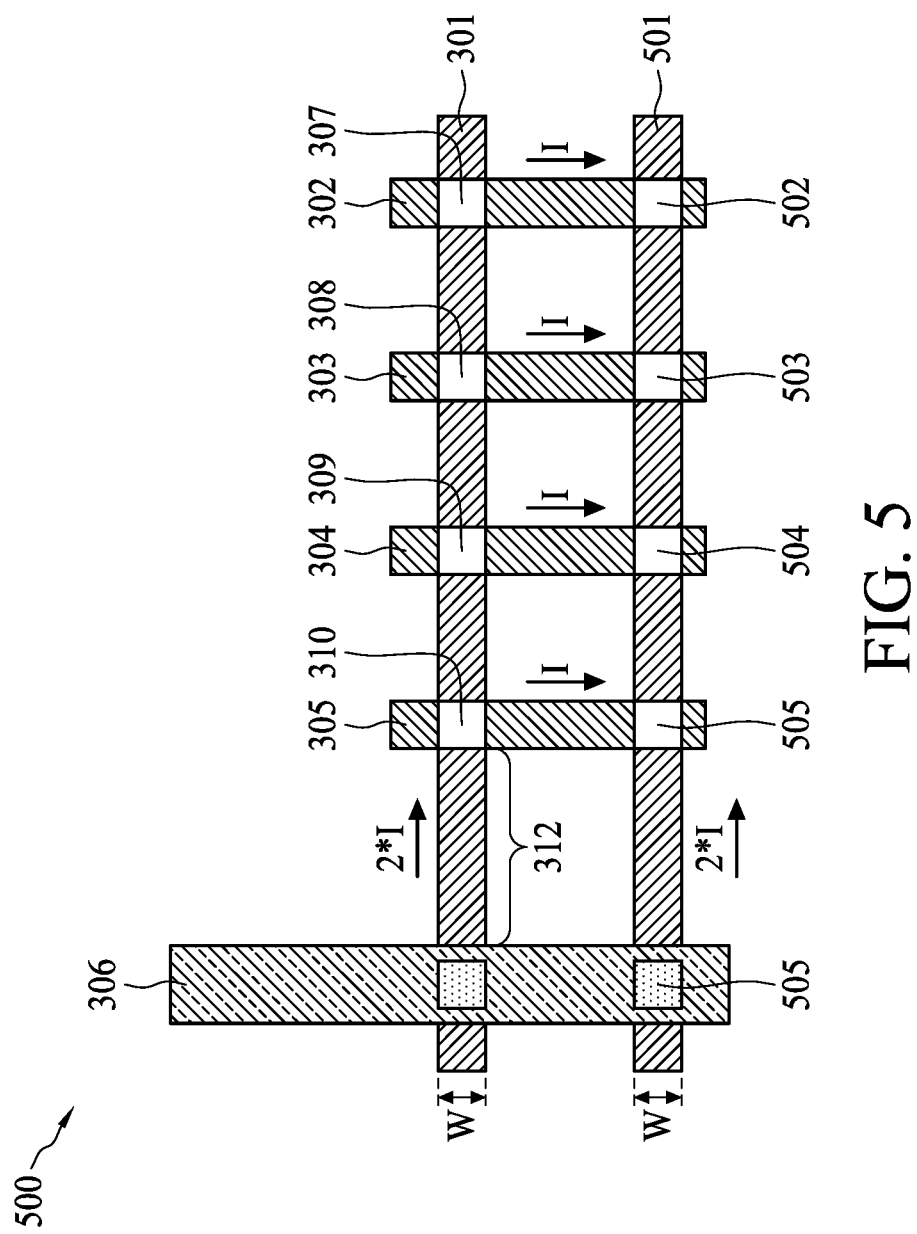

In some embodiments, the EDA tool is arranged to modify the integrated circuit 300 by adding a connecting path to electrically couple to the connecting paths 302-306. FIG. 5 is a diagram illustrating a modified integrated circuit 500 in accordance with some embodiments of the present disclosure. In comparison to the integrated circuit 300, the modified integrated circuit 500 further comprises a connecting path 501 and a plurality of vias 502-505. The vias 502-505 are arranged to electrically connect the connecting path 501 to the connecting paths 302-306 respectively. Similar to the connecting path 301, the connecting path 501 is formed on the second metal layer M2. In addition, the connecting path 306 in the modified integrated circuit 500a is extended to reach the connecting path 501. Therefore, the length of the connecting path 306 in the modified integrated circuit 500 is greater than the length of the connecting path 306 in the modified integrated circuit 300.

In some embodiments, the connecting path 501 is parallel to the connecting path 301. In some embodiments, a width W of the connecting path 501 is similar to the width W of the connecting path 301. As a result, the currents flow through the connecting paths 302-305 may be equally divided by the connecting path 301 and the connecting path 501. For example, in FIG. 5, the current flow through the connecting path 301 is 2*I, and the current flow through the connecting path 501 is also 2*I. As the current flow through the connecting path 301 as well as the connecting path 501 is smaller than 4*I, the EM phenomenon on the connecting portion 312 of the connecting path 301 may be alleviated. These are, of course, merely examples and are not intended to be limiting. In some embodiments, the supplementary connecting path may be more than one path, depending on the needs of the design.

Figure 6:
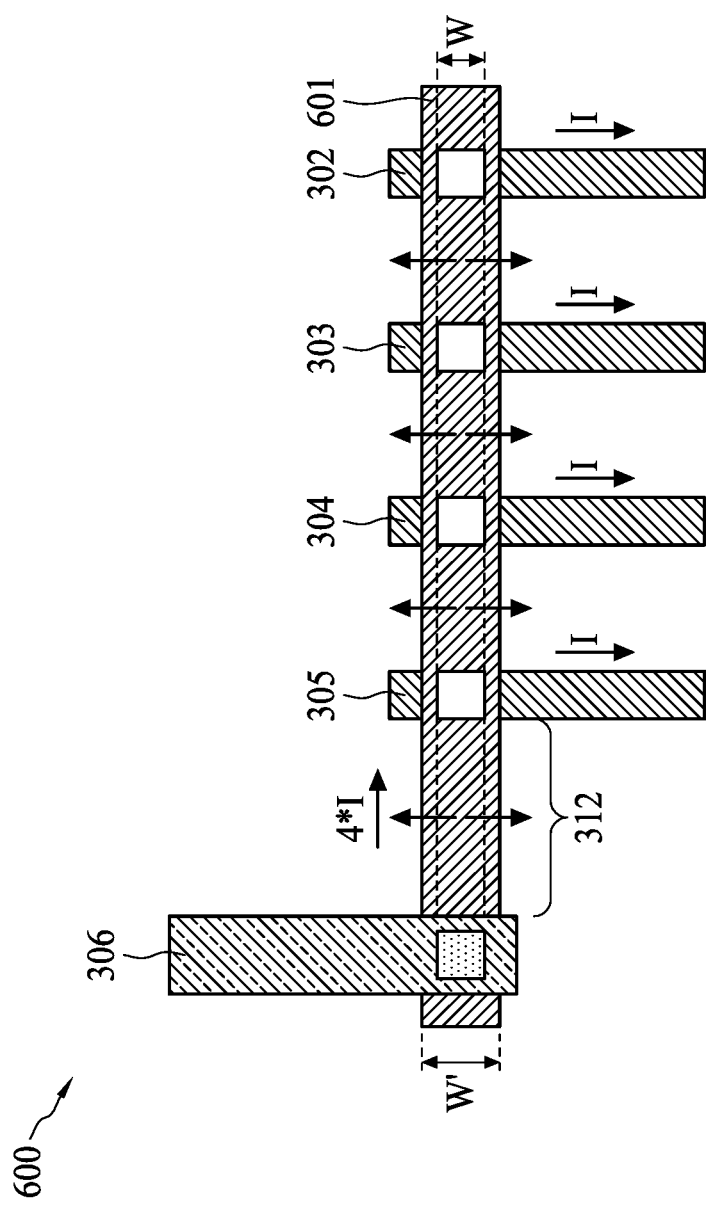

In some embodiments, the EDA tool is arranged to modify the integrated circuit 300 by enlarging the width of the connecting path 301. FIG. 6 is a diagram illustrating a modified integrated circuit 600 in accordance with some embodiments of the present disclosure. In comparison to the integrated circuit 300, the width W' of the connecting path 601 in the modified integrated circuit 600 is greater than the width W of the connecting path 301 in the integrated circuit 300. For example, the width W' of the connecting path 601 may be a double of the width W of the connecting path 301. As a result, the current density of the connecting path 601 is decreased although the current flow through the connecting path 601 is still 4*I. Thus, in some embodiments, the EM phenomenon on the connecting portion 312 of the connecting path 602 may be alleviated.

In some embodiments, the EDA tool may modify the integrated circuit 300 by using and checking if the operations described in FIG. 4A, FIG. 4B, FIG. 5, and FIG. 6 have fixed the integrated circuit 300 in a consecutive order. For examples, the EDA tool may, but not limited to, modify the integrated circuit 300 by using the operation described in FIG. 4A and if EM phenomenon in the integrated circuit 300 is not fixed, the EDA tool then may, but not limited to, modify the integrated circuit 300 by using the operation described in FIG. 4B, etc. The order of the operations, of course, merely examples and are not intended to be limiting. Moreover, in some embodiments, the first circuit may also be fixed manually by the designer.

Briefly, the above embodiments provide a method to detect and modify the EM hotspot during the EM checking and optimizing operation 112. In one or more embodiments, the EDA tool may modify the connecting path to alleviate the EM phenomenon according to the above operations. For example, the EDA tool may enlarge the width of the connecting path to alleviate the EM phenomenon. For another example, the EDA tool may add supplementary connecting path to alleviate the EM phenomenon.

Figure 7:
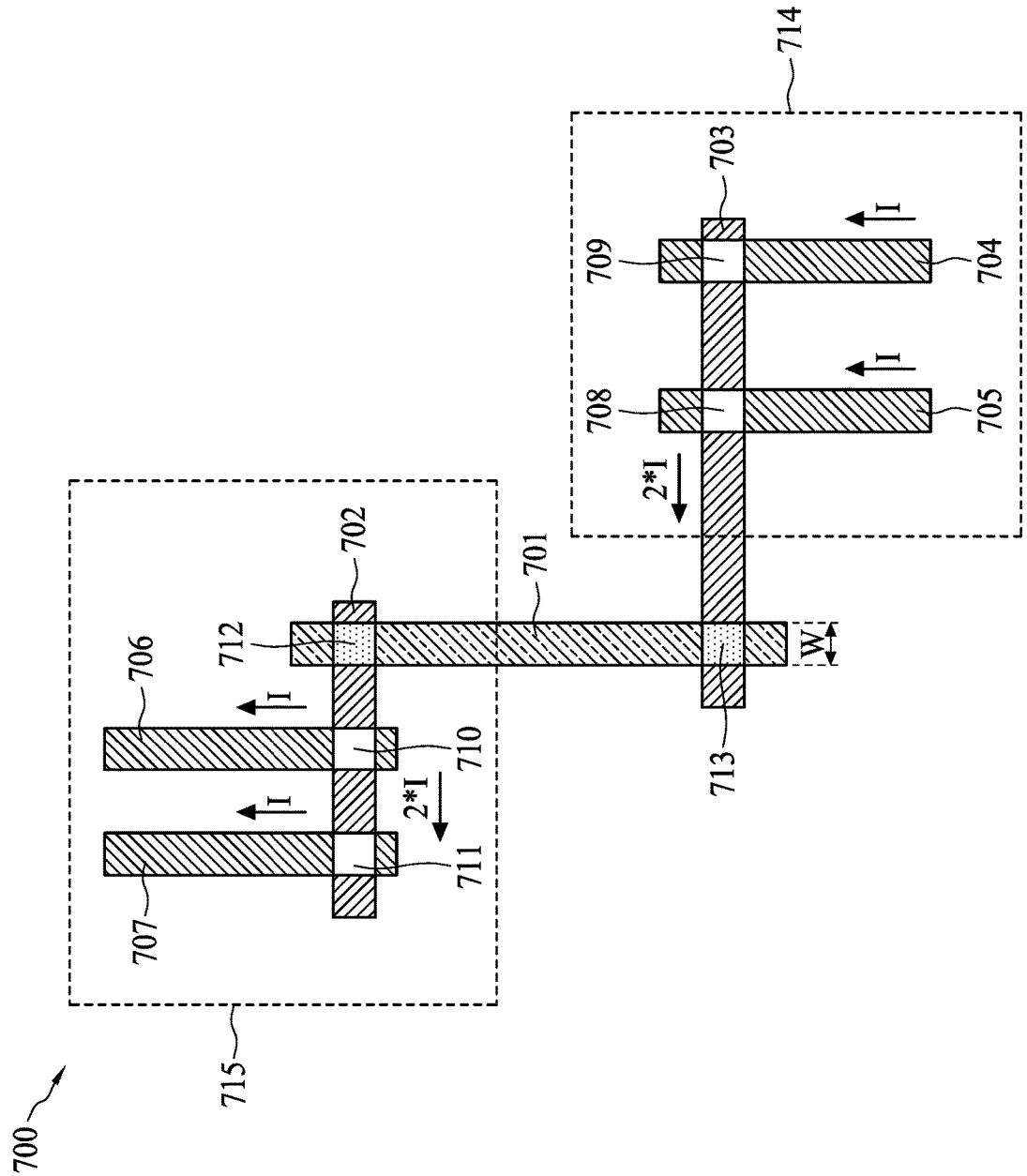
FIG. 7 is a diagram illustrating an integrated circuit in accordance with some embodiments of the present disclosure.

FIG. 7 is a diagram illustrating an integrated circuit 700 in accordance with some embodiments of the present disclosure. The EM checking operation may be performed upon the integrated circuit 700 in operation 204. In some embodiments, the integrated circuit 700 comprises a plurality of connecting paths 701-707 and a plurality of vias 708-713. The connecting paths 703-705 may be connected to a first circuit cell 714, the connecting paths 702, 706-707 may be connected to a second circuit cell 715, and the connecting path 701 may be the interconnecting path between the first circuit cell 714 and the second circuit cell 715. The connecting paths 704-707 are metal lines formed on the first metal layer M1. The connecting paths 702-703 are metal lines formed on the second metal layer M2. The connecting path 701 is a metal line formed on the third metal layer M3. The vias 708-709 are arranged to electrically connect the connecting paths 704-705 to the connecting path 703 respectively. The vias 710-711 are arranged to electrically connect the connecting paths 706-707 to the connecting path 702 respectively. The vias 712-713 are arranged to electrically connect the connecting paths 702-703 to the connecting path 701 respectively.

In one or more embodiments, the number of connecting paths 701-707 are, of course, merely examples and are not intended to be limiting. In some embodiments, the connecting paths on the first metal layer M1 may be three, five, six, or more, depending on the needs of the design.

During the EM checking operation in operation 204, the widths of the connecting paths 701-707 and the currents flowing through the connecting paths 701-707 are analyzed by an EDA tool. According to some embodiments, the connecting paths 704-707 are arranged to have the same width. The current flowing through each of the connecting paths 704-707 is I during the operation of the integrated circuit 700. According to some embodiments, the connecting paths 702-703 are arranged to have the same width. The current flowing through the connecting paths 702-703 is 2*I respectively, i.e. the sum of each current I on the connecting paths 704-705 and 706-707 respectively. In some embodiments, the electrical characteristic of the connecting path 701 may be different from the connecting paths 702-703, e.g. the width or the layer thickness is relatively small and thus the current density is relatively high. In other words, the current 2*I on the connecting path 701 may greater than the tolerable current of the connecting path 701. Therefore, the connecting path 701 may be the EM hotspot to induce EM phenomenon.

Figure 8:
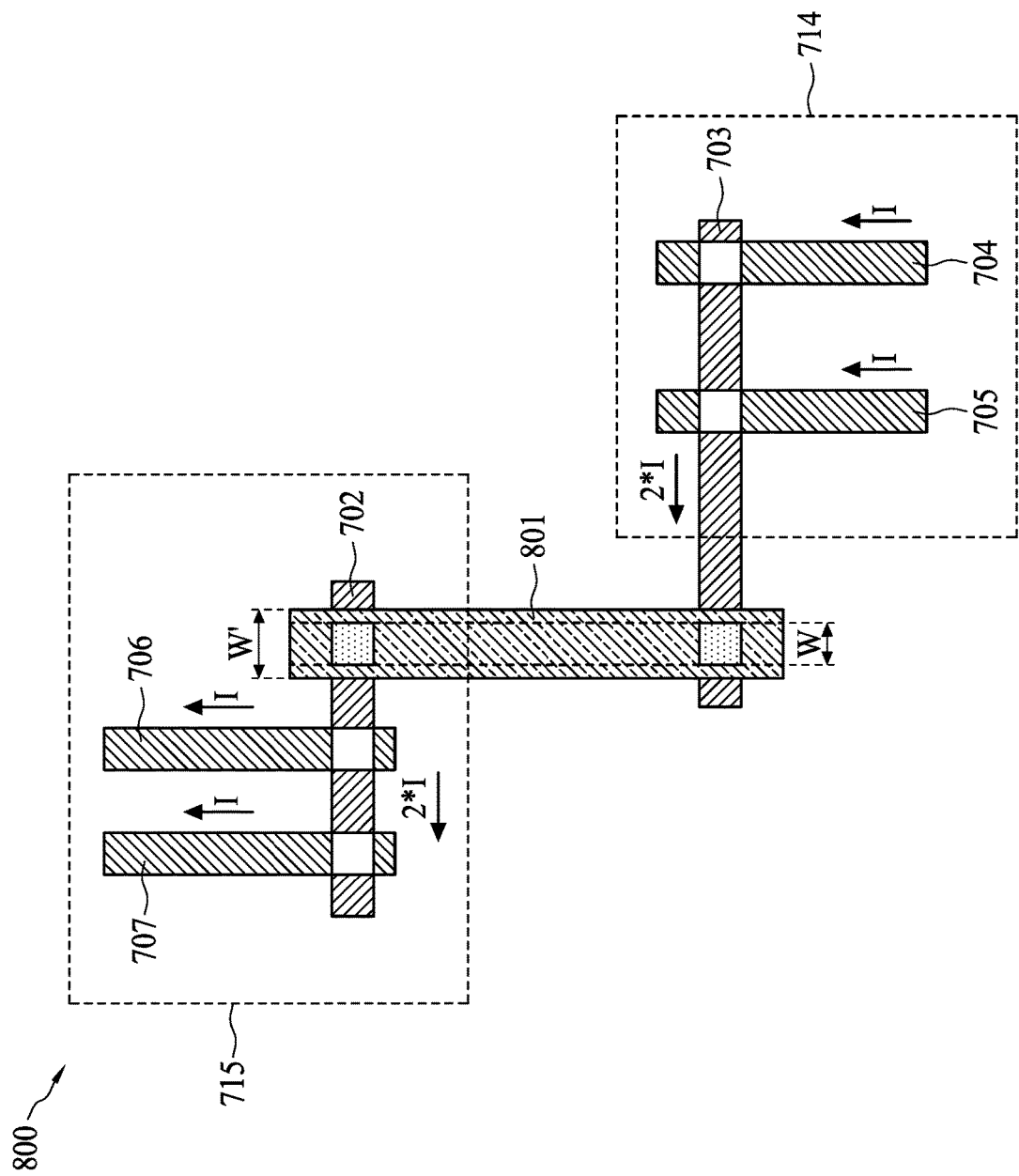
FIG. 8 and FIG. 9 are diagrams illustrating a modified integrated circuit in accordance with some embodiments of the present disclosure.

As an EM phenomenon occurs on the connecting path 701 of the integrated circuit 700, and a modifying operation is performed upon the integrated circuit 700 in operation 206. In some embodiments, the EDA tool is arranged to modify the integrated circuit 700 by enlarging the width of the connecting path 701. FIG. 8 is a diagram illustrating a modified integrated circuit 800 in accordance with some embodiments of the present disclosure. In comparison to the integrated circuit 700, the width W' of the connecting path 801 in the modified integrated circuit 800 is greater than the width W of the connecting path 701 in the integrated circuit 700. For example, the width W' of the connecting path 801 may be a double of the width W of the connecting path 701. As a result, the current density of the connecting path 801 is decreased although the current flow through the connecting path 801 is still 2*1. Thus, in some embodiments, the EM phenomenon on the connecting path 801 may be alleviated.

Figure 9:
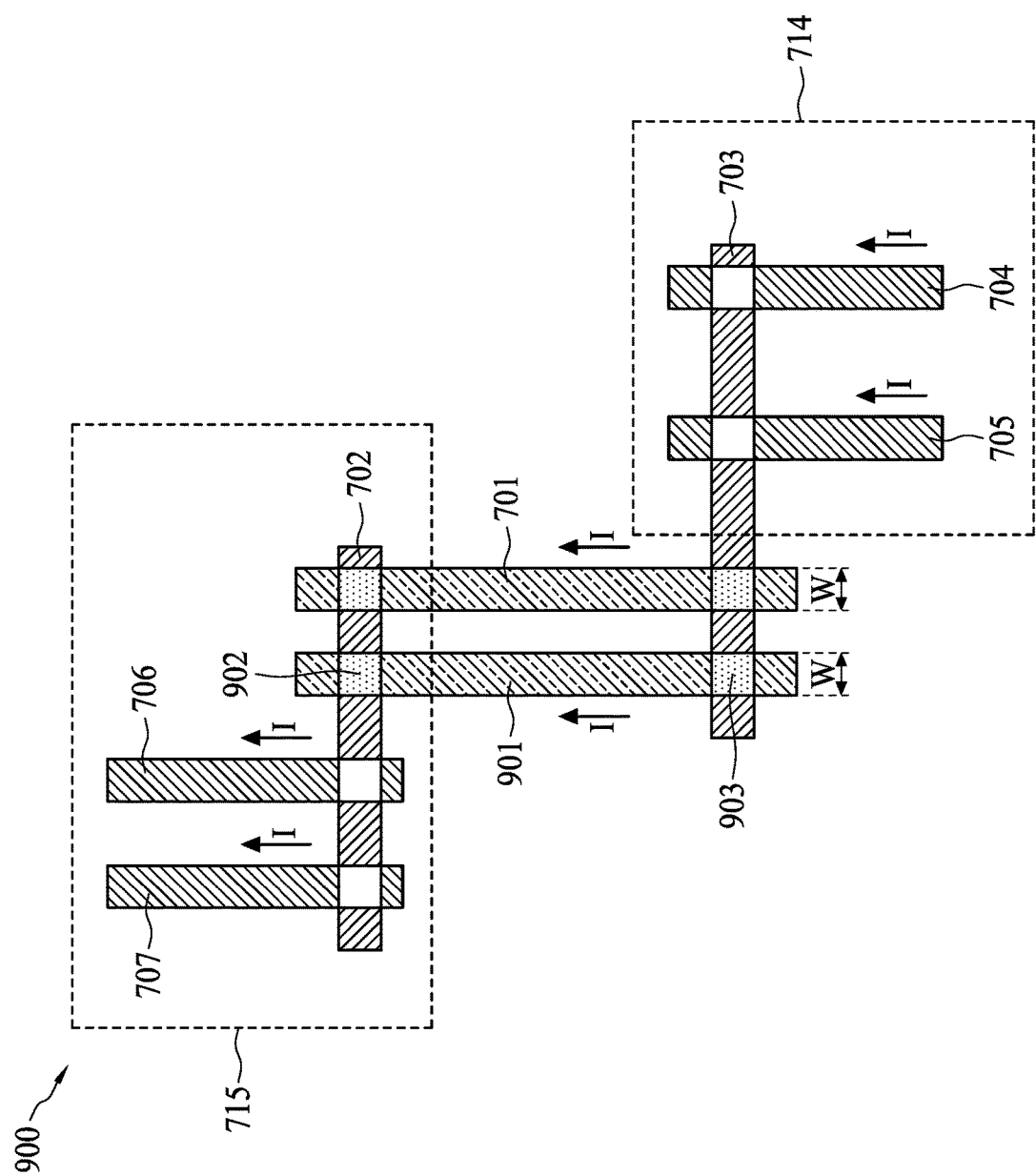

In some embodiments, the EDA tool is arranged to modify the integrated circuit 700 by adding a connecting path to electrically couple to the connecting paths 702-703. FIG. 9 is a diagram illustrating a modified integrated circuit 900 in accordance with some embodiments of the present disclosure. In comparison to the integrated circuit 700, the modified integrated circuit 900 further comprises a connecting path 901 and a plurality of vias 902-903. The vias 902-903 are arranged to electrically connect the connecting path 901 to the connecting paths 702-703 respectively. Similar to the connecting path 701, the connecting path 901 is formed on the third metal layer M3, and the connecting path 901 is parallel to the connecting path 701.

In some embodiments, a width W of the connecting path 901 is similar to the width W of the connecting path 701. As a result, the currents flow through the connecting paths 704-707 may be equally divided by the connecting path 701 and the connecting path 901. For example, in FIG. 9, the current flow through the connecting path 701 is I, and the current flow through the connecting path 901 is also I. As the current flow through the connecting path 701 as well as the connecting path 901 is smaller than 2*I, the EM phenomenon on the connecting path 701 may be alleviated. These are, of course, merely examples and are not intended to be limiting. In some embodiments, the supplementary connecting path may be more than one path, depending on the needs of the design.

In some embodiments, the EDA tool may modify the integrated circuit 700 by using and checking if the operations described in FIG. 8 and FIG. 9 have fixed the integrated circuit 700 in a consecutive order. For examples, the EDA tool may, but not limited to, modify the integrated circuit 700 by using the operation described in FIG. 8 and if EM phenomenon in the integrated circuit 700 is not fixed, the EDA tool then may, but not limited to, modify the integrated circuit 700 by using the operation described in FIG. 9. The order of the operations, of course, merely examples and are not intended to be limiting. Moreover, in some embodiments, the first circuit may also be fixed manually by the designer.

Briefly, the above embodiments provide a method to detect and modify the EM hotspot during the routing stage 110. In one or more embodiments, the EDA tool may modify the connecting path to alleviate the EM phenomenon according to the above operations. For example, the EDA tool may enlarge the width of the connecting path to alleviate the EM phenomenon. For another example, the EDA tool may add supplementary connecting path to alleviate the EM phenomenon.

Figure 10:
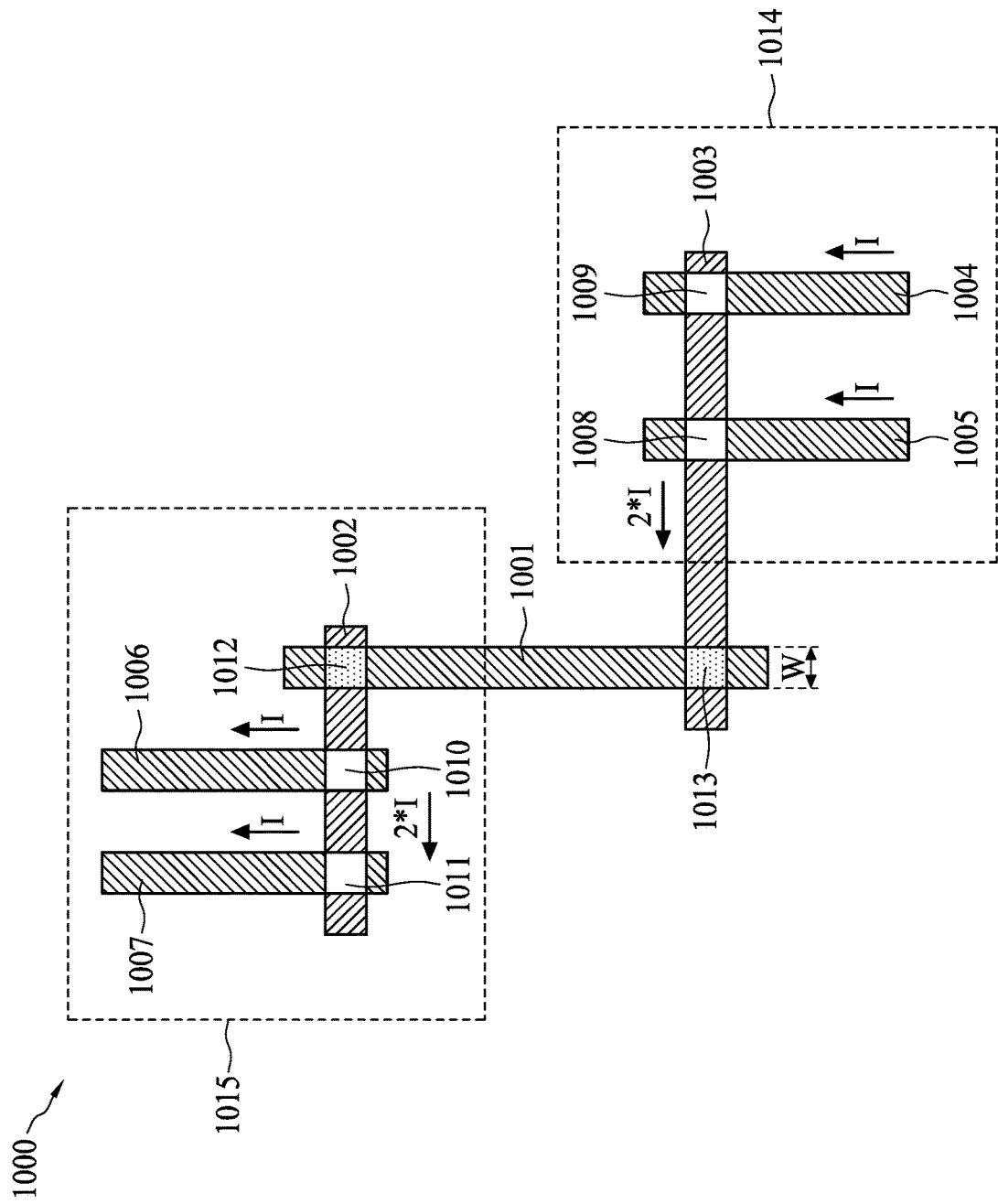
FIG. 10 is a diagram illustrating an integrated circuit in accordance with some embodiments of the present disclosure.

FIG. 10 is a diagram illustrating an integrated circuit 1000 in accordance with some embodiments of the present disclosure. The EM checking operation may be performed upon the integrated circuit 1000 in operation 204. In comparison to the integrated circuit 700, the connecting path 1001, which is an interconnecting path connecting the first circuit cell 1014 and the second circuit cell 1015, of the integrated circuit 1000 is a metal line formed on the first metal layer M1 which is the same layer with the connecting paths 1004-1007.

According to some embodiments, the connecting paths 1004-1007 are arranged to have the same width. The current flowing through each of the connecting paths 1004-1007 is I during the operation of the integrated circuit 1000. According to some embodiments, the connecting paths 1002-1003 are arranged to have the same width. The current flowing through the connecting paths 1002-1003 is 2*I respectively, i.e. the sum of each current I on the connecting paths 1004-1005 and 1006-1007 respectively. In some embodiments, the electrical characteristic of the connecting path 1001 may be different from the connecting paths 1002-1003, e.g. the width or the layer thickness is relatively small and thus the current density is relatively high. In other words, the current 2*I on the connecting path 1001 may greater than the tolerable current of the connecting path 1001. Therefore, the connecting path 1001 may be the EM hotspot to induce EM phenomenon.

Figure 11:
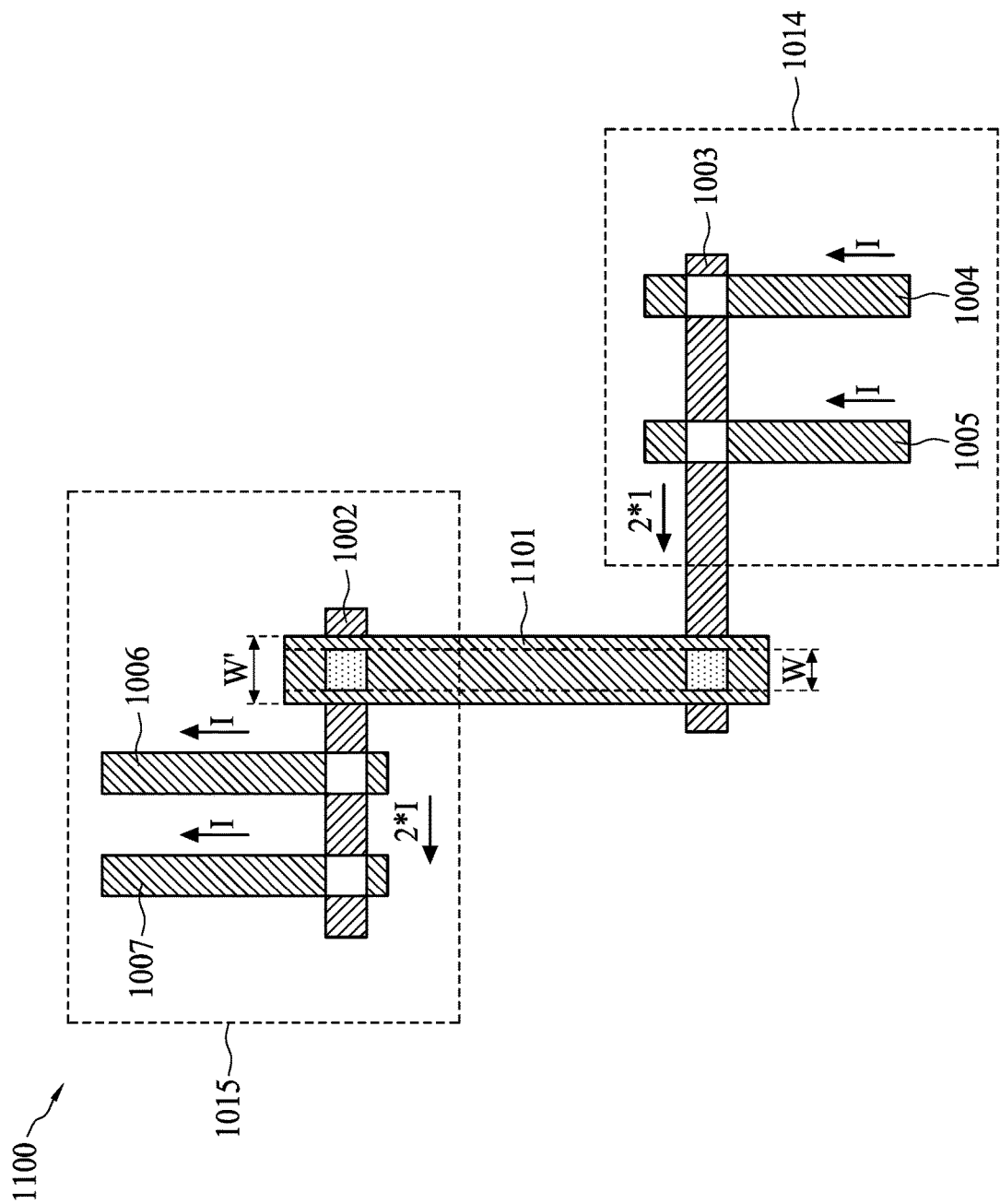
FIG. 11, FIG. 12, FIG. 13, and FIG. 14 are diagrams illustrating a modified integrated circuit in accordance with some embodiments of the present disclosure.

As an EM phenomenon occurs on the connecting path 1001 of the integrated circuit 1000, and a modifying operation is performed upon the integrated circuit 1000 in operation 206. In some embodiments, the EDA tool is arranged to modify the integrated circuit 1000 by enlarging the width of the connecting path 1001. FIG. 11 is a diagram illustrating a modified integrated circuit 1100 in accordance with some embodiments of the present disclosure. In comparison to the integrated circuit 1000, the width W' of the connecting path 1101 in the modified integrated circuit 1100 is greater than the width W of the connecting path 1001 in the integrated circuit 1000. For example, the width W' of the connecting path 1101 may be a double of the width W of the connecting path 1001. As a result, the current density of the connecting path 1101 is decreased although the current flow through the connecting path 1101 is still 2*I. Thus, in some embodiments, the EM phenomenon on the connecting path 1101 may be alleviated.

Figure 12:
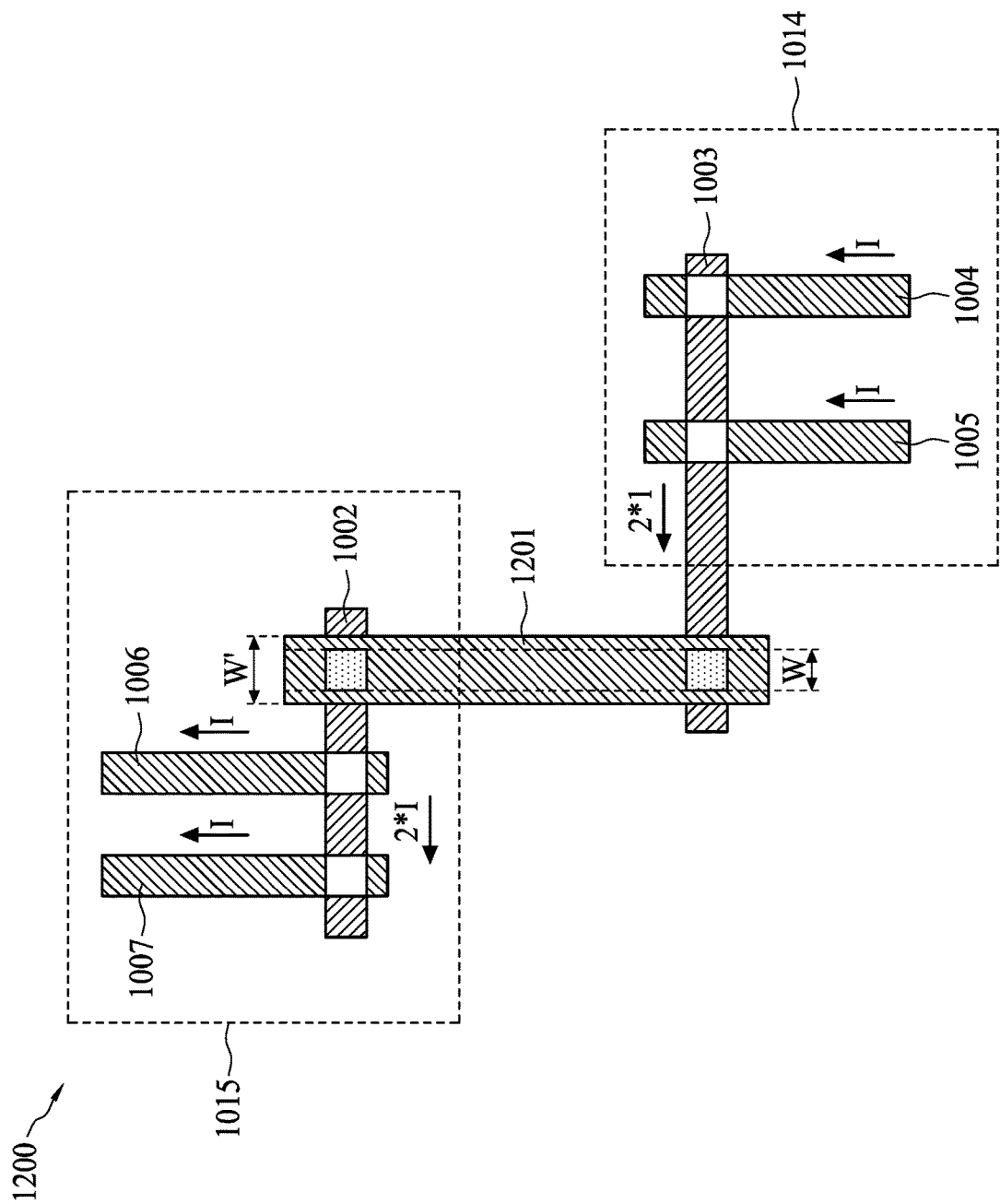

FIG. 12 is a diagram illustrating a modified integrated circuit 1200 in accordance with some embodiments of the present disclosure. In comparison to the integrated circuit 1000, the EDA tool is arranged to modify the integrated circuit 1000 by using an enlarged connecting path 1201 on the third metal layer M3 to replace the connecting path 1001 on the first metal layer M1. The width W' of the connecting path 1201 on the third metal layer M3 is greater than the width W of the connecting path 1001 in the integrated circuit 1000. The advantages of the connecting path 1201 are similar with the connecting path 1101 in the FIG. 11 and the detailed description is omitted here for brevity.

Figure 13:
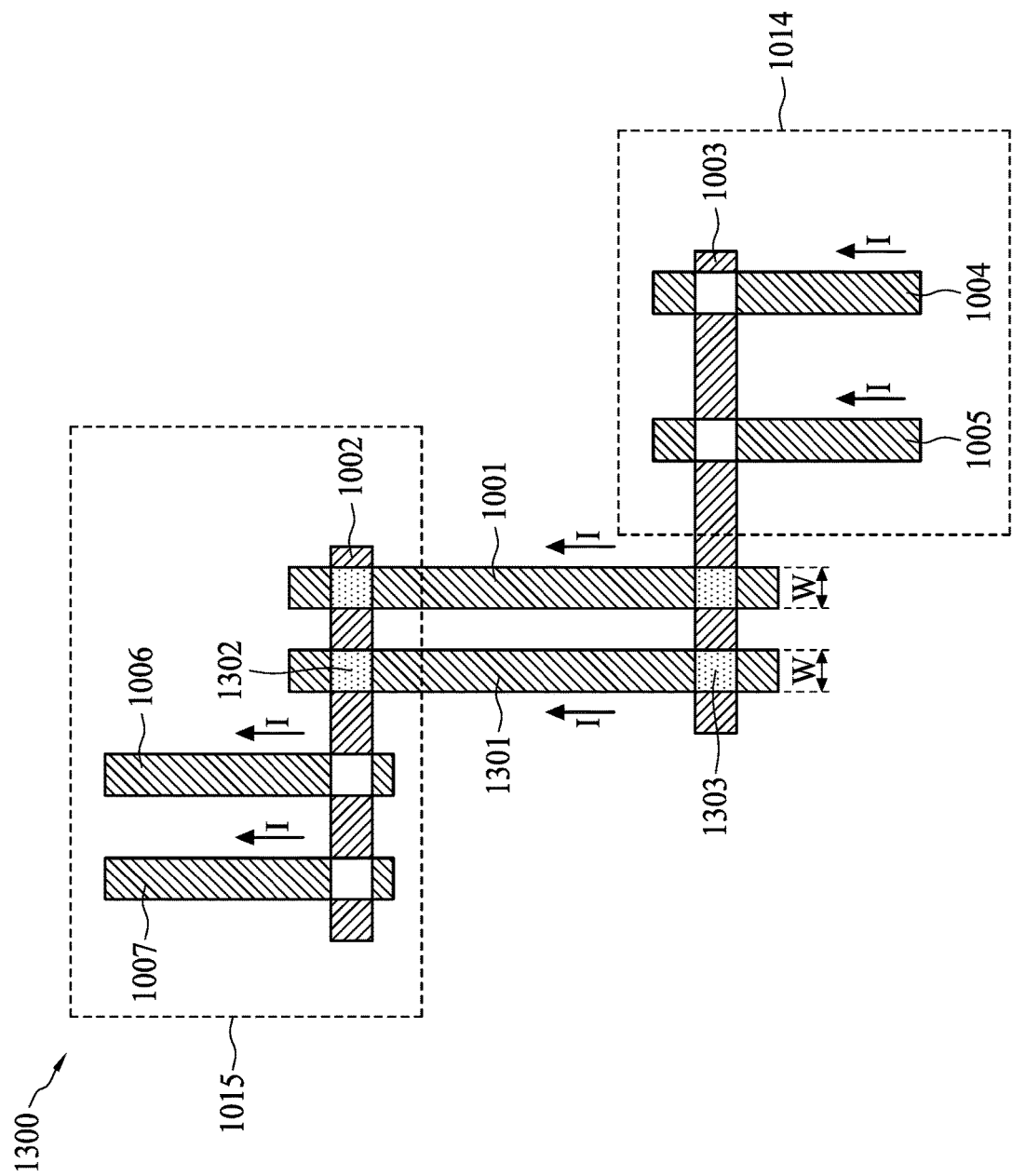

In some embodiments, the EDA tool is arranged to modify the integrated circuit 1000 by adding a connecting path to electrically couple to the connecting paths 1002-1003. FIG. 13 is a diagram illustrating a modified integrated circuit 1300 in accordance with some embodiments of the present disclosure. In comparison to the integrated circuit 1000, the modified integrated circuit 1300 further comprises a connecting path 1301 and a plurality of vias 1302-1303. The vias 1302-1303 are arranged to electrically connect the connecting path 1301 to the connecting paths 1002-1003 respectively. Similar to the connecting path 1001, the connecting path 1301 is formed on the first metal layer M1.

In some embodiments, the connecting path 1301 is parallel to the connecting path 1001. In some embodiments, a width W of the connecting path 1301 is similar to the width W of the connecting path 1001. The advantages of the connecting path 1301 are similar with the connecting path 901 in the FIG. 9 and the detailed description is omitted here for brevity. These are, of course, merely examples and are not intended to be limiting. In some embodiments, the supplementary connecting path may be more than one path, depending on the needs of the design.

Figure 14:
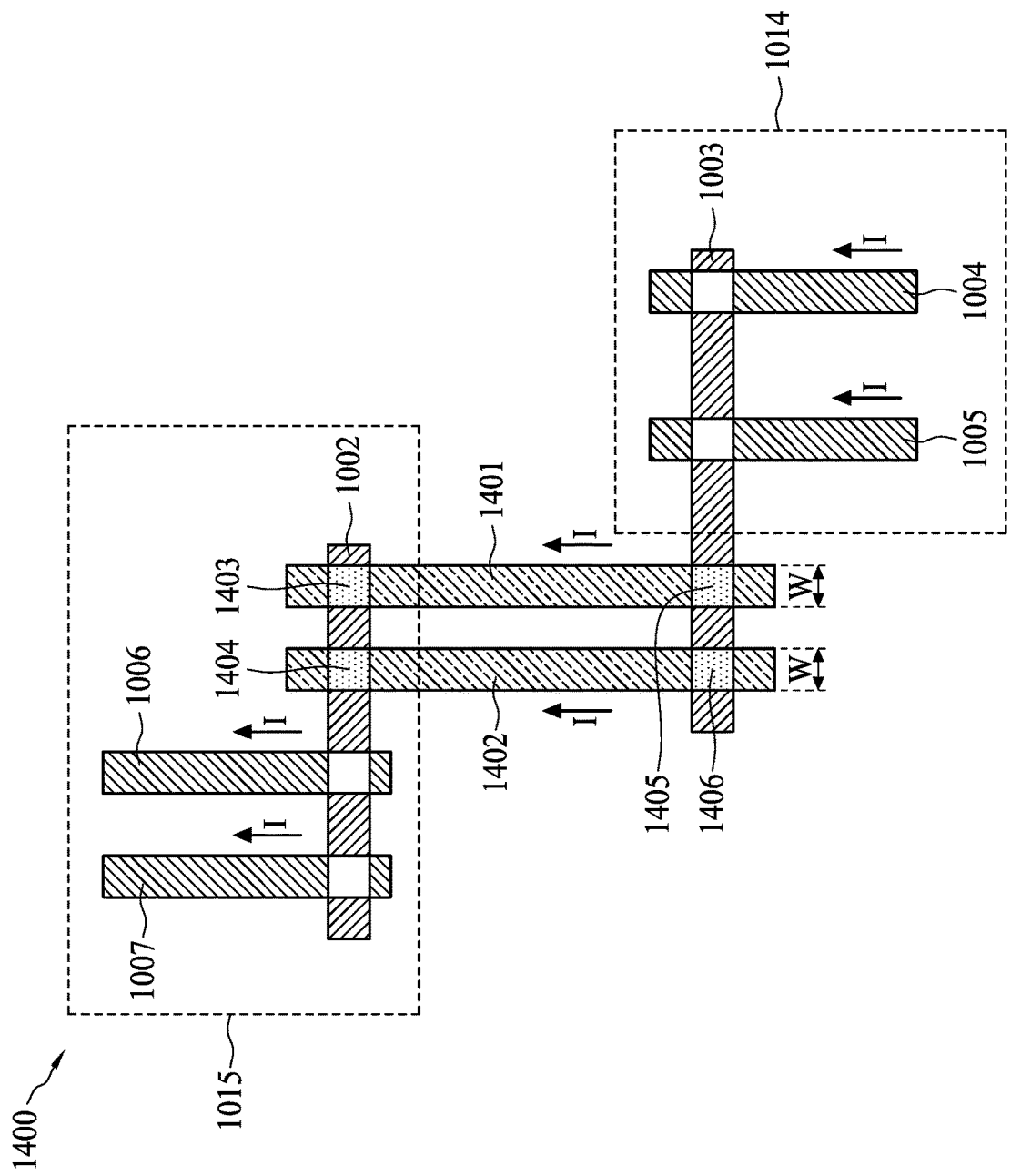

FIG. 14 is a diagram illustrating a modified integrated circuit 1400 in accordance with some embodiments of the present disclosure. In comparison to the integrated circuit 1000, the EDA tool is arranged to modify the integrated circuit 1000 by using two connecting paths 1401-1402 on the third metal layer M3 to replace connecting path 1001 on the first metal layer M1. The modified integrated circuit 1400 further comprises a plurality of vias 1403-1406. The vias 1403-1406 are arranged to electrically connect the connecting paths 1401-1402 to the connecting paths 1002-1003 respectively.

In some embodiments, the connecting path 1401 is parallel to the connecting path 1402. In some embodiments, a width W of the connecting path 1401 is similar to the width W of the connecting path 1402. The advantages of the connecting paths 1401-1402 are similar with the connecting paths 701 and 901 in the FIG. 9 and the detailed description is omitted here for brevity. These are, of course, merely examples and are not intended to be limiting. In some embodiments, the connecting path on different metal layer may be more than two paths, depending on the needs of the design.

In some embodiments, the EDA tool may modify the integrated circuit 1000 by using and checking if the operations described in FIG. 11, FIG. 12, FIG. 13, and FIG. 14 have fixed the integrated circuit 1000 in a consecutive order. For examples, the EDA tool may, but not limited to, modify the integrated circuit 1000 by using the operation described in FIG. 11 and if EM phenomenon in the integrated circuit 1000 is not fixed, the EDA tool then may, but not limited to, modify the integrated circuit 1000 by using the operation described in FIG. 12. The order of the operations, of course, merely examples and are not intended to be limiting. Moreover, in some embodiments, the first circuit may also be fixed manually by the designer.

Figure 15:
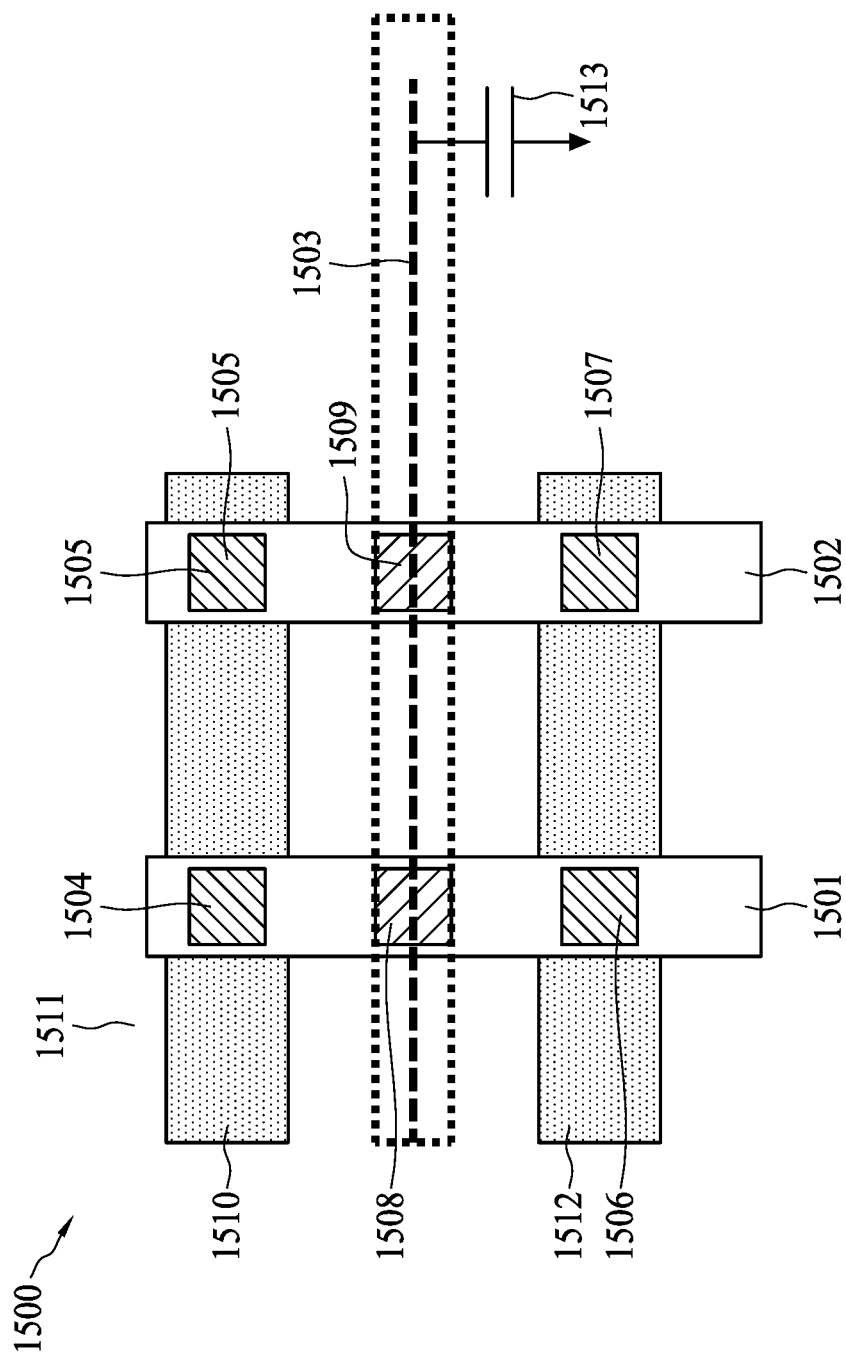
FIG. 15 is a diagram illustrating a circuit cell in accordance with some embodiments of the present disclosure.

FIG. 15 is a diagram illustrating a circuit cell 1500 in accordance with some embodiments of the present disclosure. The circuit cell 1500 may be a standard cell in an integrated circuit. For brevity, FIG. 15 is the simplified diagram of the standard cell. The EM checking operation may be performed upon the output pins of the circuit cell 1500 in operation 204 in FIG. 2. In some embodiments, the circuit cell 1500 comprises a plurality of connecting paths 1501-1503 and a plurality of vias 1504-1509. The vias 1504 and 1505 may be two contacts electrically connecting to a P-channel transistor 1510 formed on a semiconductor substrate 1511, and the vias 1506 and 1507 may be two contacts electrically connecting to an N-channel transistor 1512 formed on the semiconductor substrate 1511. The connecting paths 1501-1502 and the vias 1504-1507 may form the output pins of the circuit cell 1500. The connecting path 1503 is an interconnecting path for connecting the circuit cell 1500 to another circuit cell (not shown). In some embodiments, the connecting path 1503 may have a parasitic capacitor 1513.

According to some embodiments, the connecting paths 1501-1502 are formed on the first metal layer M1. The connecting path 1503 is formed on the second metal layer M2. The vias 1508-1509 are arranged to electrically connect the connecting paths 1501-1502 to the connecting path 1503. According to some embodiments, the first current source is a charge current source and the second current source is a discharge current source.

Figure 16:
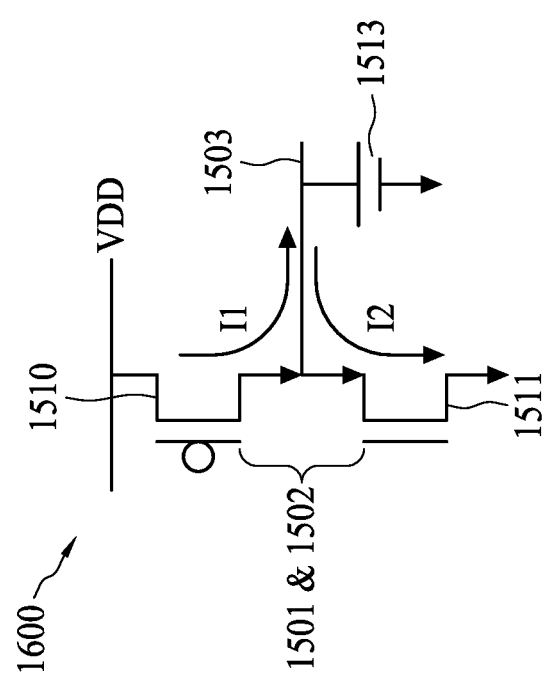
FIG. 16 is a diagram illustrating an equivalent circuit of the circuit cell in accordance with some embodiments of the present disclosure.

FIG. 16 is a diagram illustrating an equivalent circuit 1600 of the circuit cell 1500 in accordance with some embodiments of the present disclosure. During the EM checking operation, the EDA tool may analyze the flowing direction of the currents in the circuit 1600 (i.e. the circuit cell 1500). According to some embodiments, a charging current I1 is flowed from the P-channel transistor 1510 to the connecting path 1503 during a charging period of the circuit 1600. A discharging current I2 is flowed from the connecting path 1503 to the N-channel transistor 1511 during a discharging period of the circuit 1600. The charging period and the discharging period are not overlapped. In other words, when the P-channel transistor 1510 generates the charging current I1, the N-channel transistor 1511 is turned off. When the N-channel transistor 1511 generates the discharging current I2, the P-channel transistor 1510 is turned off.

Figure 17:
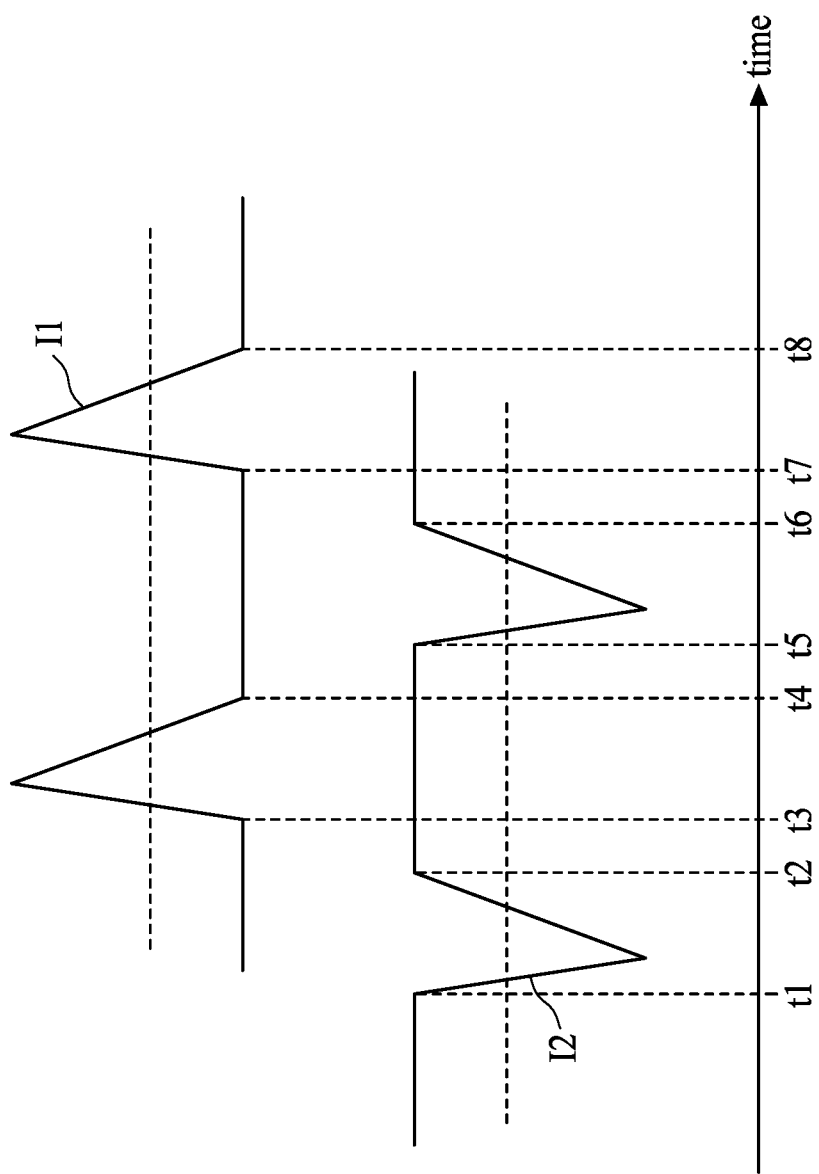
FIG. 17 is a timing diagram illustrating the charging current and the discharging current in accordance with some embodiments.

FIG. 17 is a timing diagram illustrating the charging current I1 and the discharging current I2 in accordance with some embodiments. During the charging period, e.g. t3-t4, the charging current I1 with triangle waveform is flowed from the P-channel transistor 1510 to the connecting path 1503. During the discharging period, e.g. t1-t2, the discharging current I2 with triangle waveform is flowed from the connecting path 1503 to the N-channel transistor 1511. When the flowing direction and the magnitude of the currents in the circuit 1600 is obtained, the EDA tool may redefine the connecting paths 1501-1502 into a charging portion and a discharging portion, in which the charging portion is flowed with the charging current I1, and the discharging portion is flowed with the discharging current I2. Then, the EDA tool may apply current source with similar flowing direction and magnitude on the portions of the connecting paths 1501-1502 to check the EM condition of the connecting paths 1501-1502.

Figure 18:
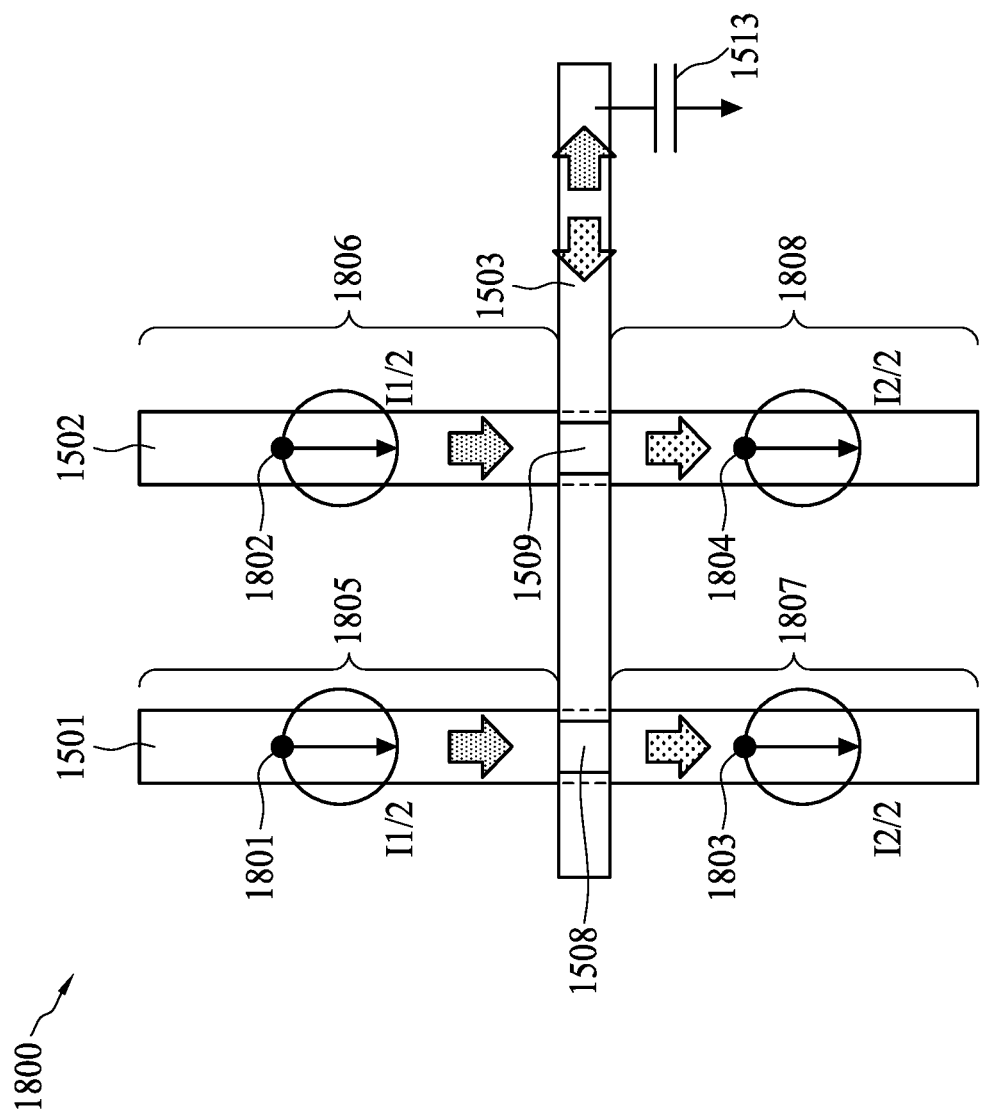
FIG. 18 is a diagram illustrating a circuit cell in accordance with some embodiments of the present disclosure.

FIG. 18 is a diagram illustrating a circuit cell 1800 in accordance with some embodiments of the present disclosure. The circuit cell 1800 may be the circuit cell 1500 under the EM checking operation. For brevity, the P-channel transistor 1510, the N-channel transistor 1511, and the vias 1504-1507 are omitted in FIG. 18. In the circuit cell 1800, four current sources 1801-1804 are hooked on or applied to the portions 1805-1808 of the connecting paths 1501-1502 respectively. According to some embodiments, as there has two connecting paths (i.e. 1501 and 1502) in the output pins, the magnitude of each current flowing through the portion 1805 and the portion 1806 is configured to be a half of the charging current I1, i.e. I1/2. Similarly, the magnitude of each current flowing through the portion 1807 and the portion 1808 is configured to be a half of the discharging current I2, i.e. I2/2. In addition, the currents I1/2 flowing through the portion 1805 and the portion 1806 (i.e. during the charging period) are not overlapped with the currents I2/2 flowing through the portion 1807 and the portion 1808 (i.e. during the discharging period).

Figure 19:
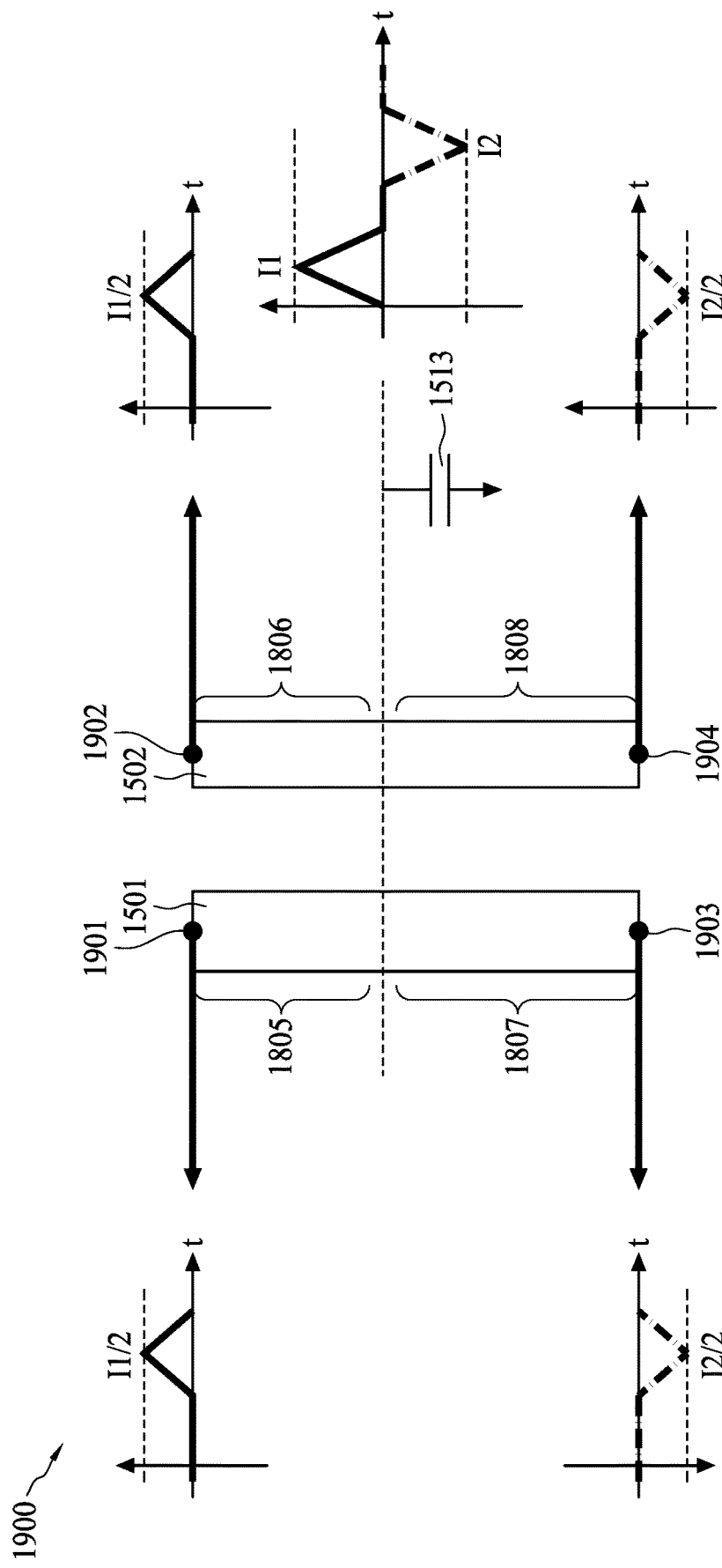
FIG. 19 is a diagram illustrating a circuit cell with current waveform during the EM checking operation in accordance with some embodiments of the present disclosure.

FIG. 19 is a diagram illustrating a circuit cell 1900 with current waveform during the EM checking operation in accordance with some embodiments of the present disclosure. For brevity, the P-channel transistor 1510, the N-channel transistor 1511, the vias 1504-1509, and the connecting path 1503 are omitted in FIG. 19. When the EM checking operation is performed on the portions 1805 and 1806, a first charging current I1/2 and a second charging current I1/2 are applied on the top pin edge 1901 of the connecting path 1501 and the top pin edge 1902 of the connecting path 1502 respectively. The charging currents I1/2 are flowed from the top pin edges 1901 and 1902 to the connecting path 1503, which is represented by the parasitic capacitor 1513, respectively. When the EM checking operation is performed on the portions 1807 and 1808, a first discharging current I2/2 and a second discharging current I2/2 are applied on the bottom pin edge 1903 of the connecting path 1501 and the bottom pin edge 1904 of the connecting path 1502 respectively. The discharging currents I2/2 are flowed from the connecting path 1503, which is represented by the parasitic capacitor 1513, to the bottom pin edges 1903 and 1904 respectively. Accordingly, the EDA tool may perform the EM checking operation inside the output pins of the circuit cell 1900 by uni-direction currents, e.g. the currents I1/2 with uni-direction flowing through the portions 1805 and 1806, and the currents I2/2 with uni-direction flowing through the portions 1807 and 1808. In some embodiments, the current waveform of the current sources 1801-1804 may be defined in Composite Current Source (CCS) library.

Briefly, the above embodiments provide a method to detect the EM hotspot inside the output pins (the connecting paths 1501-1502 and the vias 1504-1507) during the EM checking and optimizing operation 112. In one or more embodiments, the EDA tool may modify the output pins to alleviate the EM phenomenon according to the operations mentioned in FIG. 4A. FIG. 4B, FIG. 5, FIG. 6. FIG. 8. FIG. 9, FIG. 11, FIG. 12. FIG. 13, FIG. 14. The detailed description is omitted for brevity. For example, the EDA tool may enlarge the width of the connecting path to alleviate the EM phenomenon. For another example, the EDA tool may add supplementary connecting path to alleviate the EM phenomenon.

Figure 20:
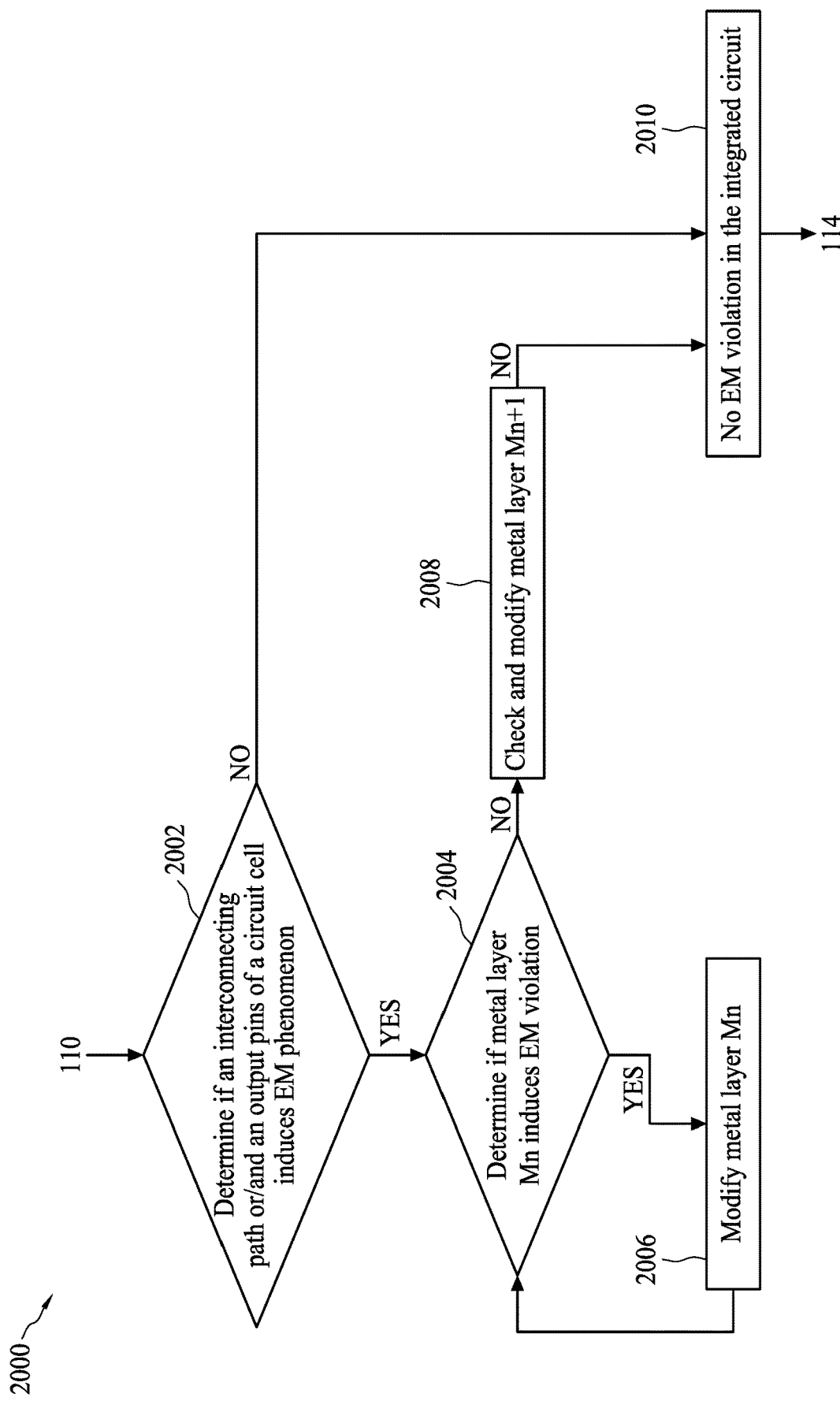
FIG. 20 is a flowchart illustrating an EM checking and optimizing operation in accordance with other embodiments of the present disclosure.

FIG. 20 is a flowchart illustrating an EM checking and optimizing operation 2000 in accordance with other embodiments of the present disclosure. The EM checking and optimizing operation 2000 may be an embodiment of the EM checking and optimizing operation 112 or 200. The EM checking and optimizing operation 2000 comprises operations 2002-2010. In operation 2002, the EM checking operation is performed upon the integrated circuit and determine if an interconnecting path(s) or/and an output pins of a circuit cell(s) induces EM phenomenon.

In operation 2004, the EM checking operation is performed upon every metal layer Mn of the integrated circuit to determine if EM phenomenon occurs. In operation 2006, EM phenomenon occurs in the metal layer Mn of the integrated circuit, and the modifying operation is performed upon the metal layer Mn of the integrated circuit. In some embodiments, the metal layer Mn is modified according to the operations mentioned in FIG. 4A, FIG. 4B. FIG. 5, FIG. 6, FIG. 8, FIG. 9, FIG. 11, FIG. 12, FIG. 13, or FIG. 14, and the detailed description is omitted for brevity. The modified metal layer Mn of the integrated circuit is then re-checked in operation 2004 in order to fix every EM phenomenon in the metal layer Mn.

In operation 2008, when the metal layer Mn has no EM phenomenon, the EM checking operation is performed upon the metal layer Mn+1 of the integrated circuit to determine if EM phenomenon occurs. In operation 2008, the operations similar to 2004 and 2006 are repeated to fix every EM phenomenon in the metal layer Mn+1. According to some embodiments, the EM checking operation may start from the first metal layer (e.g. M1) and end at the top metal layer (e.g. M8).

In operation 2010, all metal layers in the integrated circuit are checked and modified, and the EM checking and optimizing operation is ended. The modified integrated circuit is to be performed in the physical verification and signoff operation 114.

Figure 21:
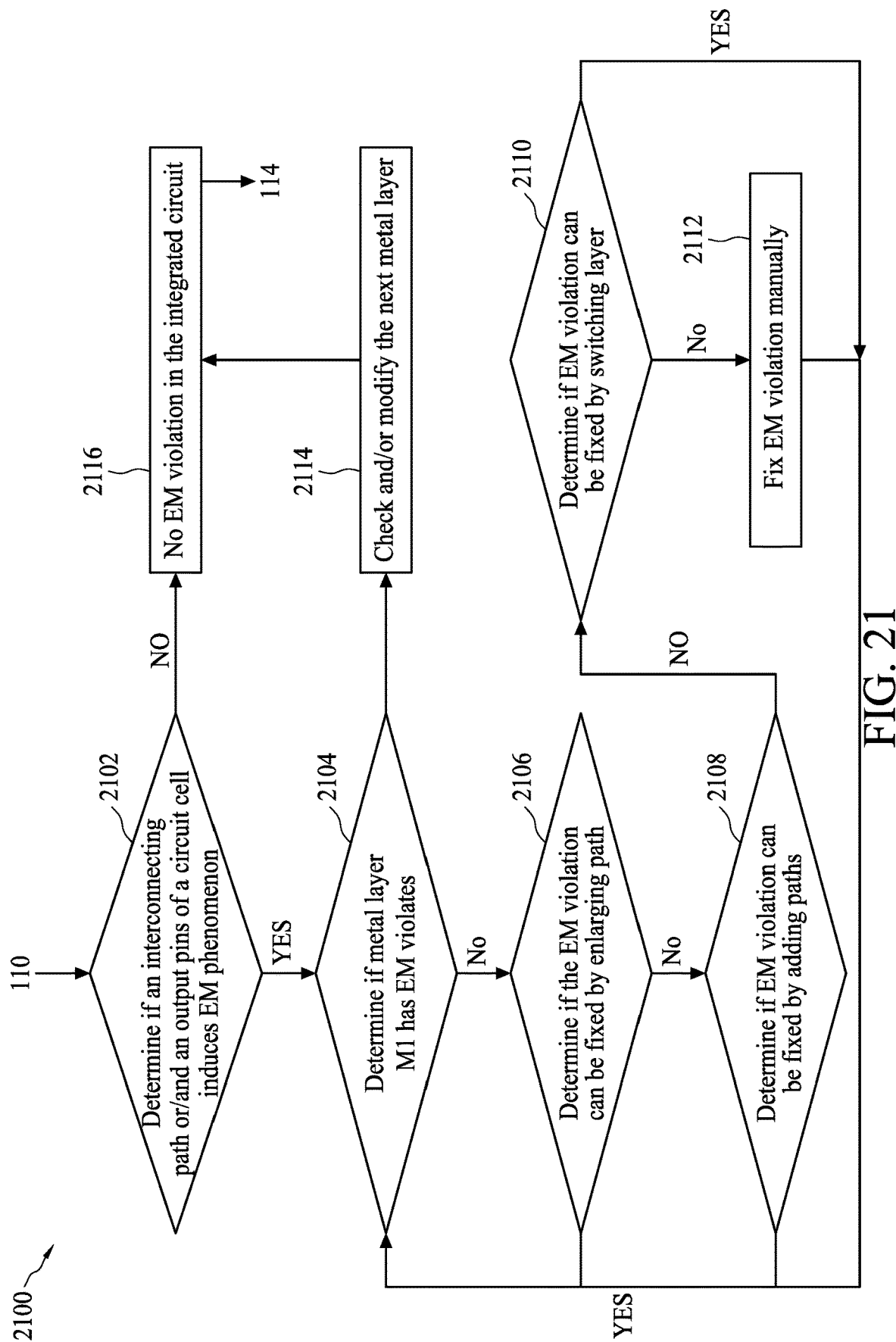
FIG. 21 is a flowchart illustrating an EM checking and optimizing operation in accordance with other embodiments of the present disclosure.

FIG. 21 is a flowchart illustrating an EM checking and optimizing operation 2100 in accordance with other embodiments of the present disclosure. The EM checking and optimizing operation 2100 may be an embodiment of the EM checking and optimizing operation 112 or 200. The EM checking and optimizing operation 2100 comprises operations 2102-2116. In operation 2102, the EM checking operation is performed upon the integrated circuit and determine if an interconnecting path(s) or/and an output pins of a circuit cell(s) induces EM phenomenon.

In operation 2104, the EM checking operation is performed upon the first metal layer M1 of the integrated circuit to determine every EM phenomenon on the first metal layer M1.

In operation 2106, an EM phenomenon occurred on a connecting path of the first metal layer M1 is modified by the method of enlarging the width of the connecting path as described in FIG. 6, FIG. 8, or FIG. 11. If the EM phenomenon of the connecting path is fixed, the operation goes to operation 2104 to select another EM phenomenon on the first metal layer M1. If the EM phenomenon of the connecting path is not fixed, the operation goes to operation 2108.

In operation 2108, the EM phenomenon occurred on the connecting path of the first metal layer M is modified by the method of adding supplementary connecting path as described in FIG. 5, FIG. 9, or FIG. 13. If the EM phenomenon of the connecting path is fixed, the operation goes to operation 2104 to select another EM phenomenon on the first metal layer M1. If the EM phenomenon of the connecting path is not fixed, the operation goes to operation 2110.

In operation 2110, the EM phenomenon occurred on the connecting path of the first metal layer M1 is modified by the method of using the connecting path on the another metal layer as described in FIG. 12 and FIG. 14. If the EM phenomenon of the connecting path is fixed, the operation goes to operation 2104 to select another EM phenomenon on the first metal layer M1. If the EM phenomenon of the connecting path is not fixed, the operation goes to operation 2112.

In operation 2112, a manually modifying operation is performed upon the connecting path of the first metal layer M1. When the EM phenomenon of the connecting path is manually fixed, the operation goes to operation 2104 to select another EM phenomenon on the first metal layer M1.

According to some embodiments, when all the EM phenomenon on the first metal layer M1 are fixed, the EM checking operation is then proceeded to next metal layer (e.g. M2) layer. i.e. the operation 2114. The checking and modifying operations on the next metal layer are similar to the operations 2104-2112, and the detailed description is omitted for brevity.

In operation 2116, when the EM phenomenon on all the metal layers of the integrated circuit are fixed, the EM checking operation is ended. The modified integrated circuit is to be performed in the physical verification and signoff operation 114. The order of the operations 2106, 2108, 2110, of course, merely examples and are not intended to be limiting.

Figure 22:
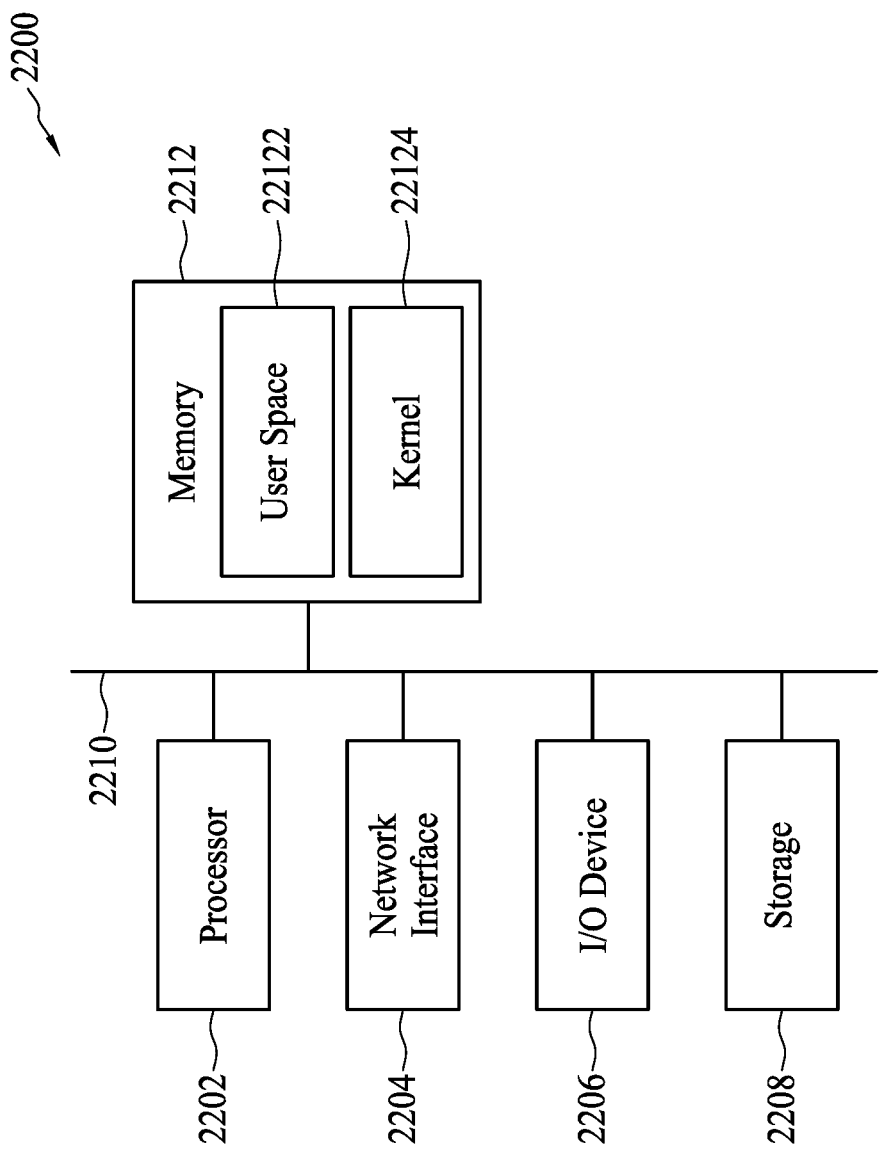
FIG. 22 is a diagram of a hardware system for implementing the EM checking and optimizing operation to generate the modified integrated circuit in accordance with some embodiments.

FIG. 22 is a diagram of a hardware system 2200 for implementing the EM checking and optimizing operation 112 (or the EM checking and optimizing operation 200, 2000, or 2100) to generate the modified integrated circuit 400a (or the modified integrated circuit 400b, 500, 600, 800, 900, 1100, 1200, 1300, or 1400) in accordance with some embodiments. The system 2200 includes at least one processor 2202, a network interface 2204, an input and output (I/O) device 2206, a storage 2208, a memory 2212, and a bus 2210. The bus 2210 couples the network interface 2204, the I/O device 2206, the storage 2208 and the memory 2212 to the processor 2202.

In some embodiments, the memory 2212 comprises a random access memory (RAM) and/or other volatile storage device and/or read only memory (ROM) and/or other non-volatile storage device. The memory 2212 includes a kernel 22124 and user space 22122, configured to store program instructions to be executed by the processor 2202 and data accessed by the program instructions.

In some embodiments, the network interface 2204 is configured to access program instructions and data accessed by the program instructions stored remotely through a network. The I/O device 2206 includes an input device and an output device configured for enabling user interaction with the system 2200. The input device comprises, for example, a keyboard, a mouse, etc. The output device comprises, for example, a display, a printer, etc. The storage device 2208 is configured for storing program instructions and data accessed by the program instructions. The storage device 2208 comprises, for example, a magnetic disk and an optical disk.

In some embodiments, when executing the program instructions, the processor 2202 is configured to perform the operations of the EM checking and optimizing operation 112 (or the EM checking and optimizing operation 200, 2000, or 2100) as described with reference to FIG. 1 (or FIG. 2, FIG. 20, or FIG. 21).

In some embodiments, the program instructions are stored in a non-transitory computer readable recording medium such as one or more optical disks, hard disks and non-volatile memory devices.

Figure 23:
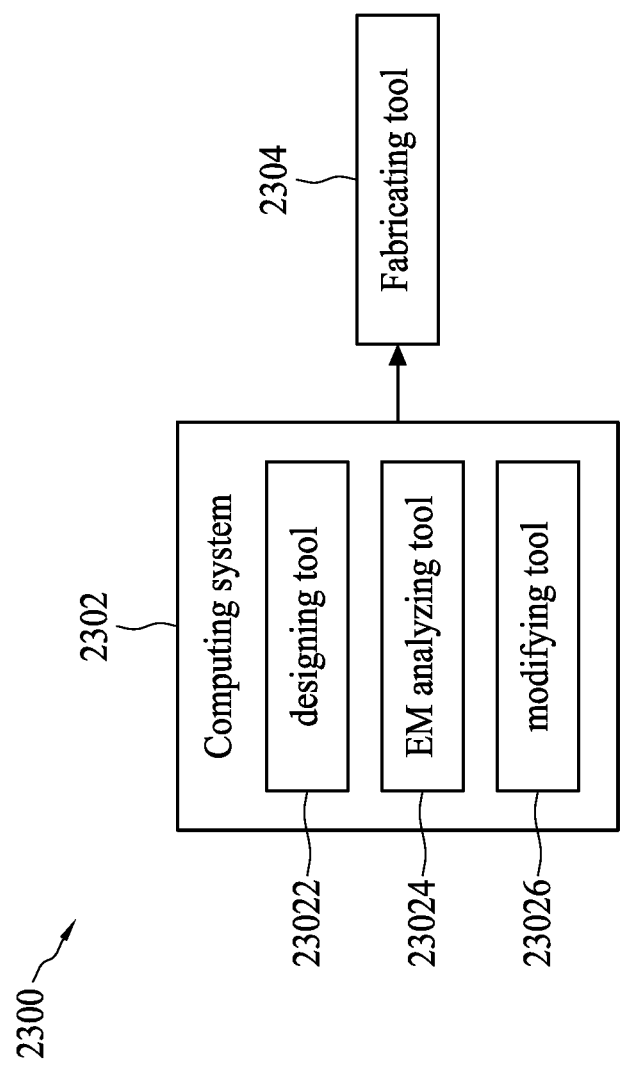
FIG. 23 is a diagram of a system for fabricating the modified integrated circuit in accordance with some embodiments.

FIG. 23 is a diagram of a system 2300 for fabricating the modified integrated circuit 400a (or the modified integrated circuit 400b. 500, 600, 800, 900, 1100, 1200, 1300, or 1400) in accordance with some embodiments. The system 2300 comprises a computing system 2302 and a fabricating tool 2304. The computing system 2302 is arranged to perform operations of the EM checking and optimizing operation 112 (or the EM checking and optimizing operation 200, 2000, or 2100) to generate the circuit layout of the modified integrated circuit 400a (or the modified integrated circuit 400b, 500, 600, 800, 900, 1100, 1200, 1300, or 1400). According to some embodiments, the computing system 2302 may include the hardware system 2200 in FIG. 22. In some embodiments, the computing system may include a designing tool 23022, an EM analyzing tool 23024, and a modifying tool 23026. In one or more embodiments, the computing system may function as the EDA tool.

The designing tool 23022 is arranged to provide a first circuit cell having an output pin formed therein. The first circuit cell may be the integrated circuit 300, 700, 1000, 1500, 1800, or 1900. The designing tool 23022 may be implemented by the processor 2202 and the storage 2208, in which the processor 2202 may access the storage 2208 to provide a stored first circuit cell.

The EM analyzing tool 23024 is arranged to analyze an EM data of the output pin to determine if the output pin induces EM phenomenon. For brevity, the EM analyzing tool 23024 may analyze the EM data of the output pin using the operations described in FIG. 15, FIG. 16, FIG. 17, FIG. 18, and FIG. 19. The EM analyzing tool 23024 may be implemented by the processor 2202, in which the processor 2202 may analyze the EM data of the output pin to determine if the output pin induces EM phenomenon.

The modifying tool 23026 is arranged to modify the output pin for generating a second circuit cell having a modified output pin when the EM analyzing tool 20324 indicates that the output pin induces EM phenomenon. For brevity, the modifying tool 23026 may modify the output pin using the operations described in FIG. 4A, FIG. 4B, FIG. 5, FIG. 6, FIG. 8, FIG. 9, FIG. 11, FIG. 12, FIG. 13, or FIG. 14. The modifying tool 23026 may be implemented by the processor 2202, in which the processor 2202 may modify the output pin to generate the second circuit cell.

The fabricating tool 2304 may be a cluster tool for fabricating an integrated circuit. The cluster tool may be a multiple reaction chamber type composite equipment which includes a polyhedral transfer chamber with a wafer handling robot inserted at the center thereof, a plurality of process chambers positioned at each wall face of the polyhedral transfer chamber; and a load lock chamber installed at a different wall face of the transfer chamber. At the fabrication stage, at least one photomask is used, for example, for one patterning operation for forming a feature of ICs, such as gate lines of transistors, source or drain regions for the transistors, metal lines for interconnects and vias for the interconnects, on a wafer.

Briefly, the above embodiments provide methods and systems for detecting the EM hotspot inside the circuit cell (and the output pins) during the EM checking and optimizing operation. In some embodiments, the EM hotspot on the output pins may be detected by applying uni-direction current to the output pins. In one or more embodiments, the circuit cell may be modified to alleviate the EM phenomenon. For example, the width of the connecting path may be enlarged to alleviate the EM phenomenon. For another example, supplementary connecting path may be added to alleviate the EM phenomenon.

According to some embodiments, a method for forming an integrated device is provided. The method includes following operations. A first circuit is provided. The first circuit has a first connecting path, a plurality of second connecting paths, and a third connecting path. The plurality of second connecting paths are electrically connected to a first connecting portion of the first connecting path. The third connecting path is electrically coupled to a second connecting portion of the first connecting path. An electromigration (EM) data of the first connecting path is analyzed to determine if a third connecting portion between the first connecting portion and the second connecting portion induces EM phenomenon. The first circuit is modified for generating a second circuit when the third connecting portion induces EM phenomenon. The integrated device according to the second circuit is generated.

According to other embodiments, a method for forming an integrated device is provided. The method includes following operations. A first circuit is provided. The first circuit has a first connecting path, a second connecting path, and a third connecting path, the first connecting path is electrically coupled to a first terminal of the second connecting path. The third connecting path is electrically coupled to a second terminal of the second connecting path. An electromigration (EM) data of the second connecting path is analyzed to determine if the second connecting path induces EM phenomenon. The first circuit is modified for generating a second circuit when the second connecting path induces EM phenomenon. The integrated device according to the second circuit is generated.

According to other embodiments, a system for forming an integrated device is provided. The system includes a designing tool, an electromigration (EM) analyzing tool, a modifying tool, and a fabricating tool. The designing tool is arranged to provide a first circuit cell having an output pin formed therein. The EM analyzing tool is arranged to analyze an EM data of the output pin to determine if the output pin induces EM phenomenon. The modifying tool is arranged to modify the output pin for generating a second circuit cell having a modified output pin when the EM analyzing tool indicates that the output pin induces EM phenomenon. The fabricating tool is arranged to generate the integrated device according to the second circuit cell.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an integrated device, comprising:
providing a first circuit having a first connecting path in a first metal line layer, a plurality of second connecting paths in a second metal line layer, and a third connecting path in a third metal line layer, wherein the plurality of second connecting paths are electrically connected to a first connecting portion of the first connecting path in the first metal line layer, the third connecting path is electrically coupled to a second connecting portion of the first connecting path in the first metal line layer;
analyzing an electromigration (EM) data of the first connecting path to determine if a third connecting portion in the first metal line layer between the first connecting portion and the second connecting portion induces EM phenomenon;
modifying the first circuit for generating a second circuit when the third connecting portion induces EM phenomenon; and
generating the integrated device according to the second circuit.

2. The method of claim 1, wherein the modifying the first circuit for generating the second circuit when the third connecting portion induces EM phenomenon comprises:

moving the third connecting path to connect to the first connecting portion of the first connecting path.

3. The method of claim 2, wherein the plurality of second connecting paths comprises a first sub-connecting path and a second sub-connecting path electrically coupled to a first position and a second position on the first connecting portion respectively, and the moving the third connecting path to connect to the first connecting portion of the first connecting path comprises:
moving the third connecting path to connect to a position between the first position and the second position on the first connecting portion.

4. The method of claim 1, wherein the modifying the first circuit for generating the second circuit when the third connecting portion induces EM phenomenon comprises:
arranging a fourth connecting path to electrically couple to the third connecting path and the plurality of second connecting paths.

5. The method of claim 4, wherein the fourth connecting path is parallel to the first connecting path.

6. The method of claim 1, wherein the modifying the first circuit for generating the second circuit when the third connecting portion induces EM phenomenon comprises:
enlarging a width of the first connecting path.

7. A method for forming an integrated device, comprising:
providing a first circuit having a first connecting path in a first metal line layer, a second connecting path in a second metal line layer, and a third connecting path in a third metal line layer, wherein the first connecting path is electrically coupled to a first terminal of the second connecting path, and the third connecting path is electrically coupled to a second terminal of the second connecting path, wherein the second metal line layer is between the first metal line layer and the third metal line layer;
analyzing an electromigration (EM) data of the second connecting path to determine if the second connecting path induces EM phenomenon;
modifying the first circuit for generating a second circuit when the second connecting path induces EM phenomenon; and
generating the integrated device according to the second circuit.

8. The method of claim 7, wherein modifying the first circuit for generating the second circuit when the first connecting portion induces EM phenomenon comprises:
enlarging a width of the second connecting path.

9. The method of claim 7, wherein modifying the first circuit for generating the second circuit when the first connecting portion induces EM phenomenon comprises:
arranging a fourth connecting path to electrically couple to the first connecting path and the third connecting path.

10. The method of claim 7, wherein the second connecting path is disposed on a first conductor layer, and modifying the first circuit for generating the second circuit when the first connecting portion induces EM phenomenon comprises:
replacing the second connecting path by a fourth connecting path disposed on a second conductor layer different from the first conductor layer;
wherein the first connecting path is electrically coupled to a first terminal of the fourth connecting path, and the third connecting path is electrically coupled to a second terminal of the fourth connecting path.

11. The method of claim 10, wherein a width of the fourth connecting path is greater than the width of the second connecting path.

12. The method of claim 7, wherein the second connecting path is disposed on a first conductor layer, and modifying the first circuit for generating the second circuit when the first connecting portion induces EM phenomenon comprises:
replacing the second connecting path by a plurality of fourth connecting paths disposed on a second conductor layer different from the first conductor layer;
the first connecting path is electrically coupled to a plurality of first terminals of the plurality of fourth connecting paths, and the third connecting path is electrically coupled to a plurality of second terminals a second terminal of the plurality of fourth connecting paths.

13. The method of claim 12, wherein a width of each of the plurality of fourth connecting paths is similar to the width of the second connecting path.

14. A system for forming an integrated device, comprising:
a designing tool, arranged to provide a first circuit cell having an output pin formed therein, wherein the output pin is defined in a metal line layer;
an electromigration (EM) analyzing tool, arranged to analyze an EM data of the output pin to determine if the output pin induces EM phenomenon;
a modifying tool, arranged to modify the output pin for generating a second circuit cell having a modified output pin when the EM analyzing tool indicates that the output pin induces EM phenomenon; and
a fabricating tool, arranged to generate the integrated device according to the second circuit cell.

15. The system of claim 14, wherein the EM analyzing tool analyzes the EM data of the output pin by applying a first current on a first position of the output pin and applying a second current on a second position of the output pin, wherein the second position is different from the first position.

16. The system of claim 15, wherein the first circuit cell further comprises:
a first transistor, electrically coupled to the first position of the output pin; and
a second transistor, electrically coupled to the second position of the output pin;
wherein the designing tool further provides a connecting path connecting a third position of the output pin, the third position is located between the first position and the second position, the EM analyzing tool is arranged to apply the first current to flow to the connecting path from the first position via the third position during a first time period, the EM analyzing tool is arranged to apply the second current to flow from the connecting path to the second position via the third position during a second time period.

17. The system of claim 16, wherein the first time period is not overlapped with the second time period.

18. The system of claim 16, wherein the first transistor is a P-channel transistor and the second transistor is an N-channel transistor.

19. The system of claim 14, wherein the modifying tool is arranged to generate the modified output pin by enlarging a width of the output pin.

20. The system of claim 14, wherein the modifying tool is arranged to generate the modified output pin having a plurality of parallel paths.

* * * * *